(12) United States Patent
Kocienda et al.

(10) Patent No.: US 11,847,256 B2
(45) Date of Patent: Dec. 19, 2023

(54) PRESENTING AND ALIGNING LASER PROJECTED VIRTUAL INTERFACES

(71) Applicant: Humane, Inc., San Francisco, CA (US)

(72) Inventors: Kenneth Luke Kocienda, Mill Valley, CA (US); Imran A. Chaudhri, San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/687,484

(22) Filed: Mar. 4, 2022

(65) Prior Publication Data

US 2023/0280821 A1    Sep. 7, 2023

(51) Int. Cl.

| | |
|---|---|
| *G06F 3/01* | (2006.01) |
| *G06T 7/521* | (2017.01) |
| *G06T 7/70* | (2017.01) |
| *G06V 40/10* | (2022.01) |
| *H04N 9/03* | (2023.01) |
| *G06F 3/042* | (2006.01) |
| *H04N 9/31* | (2006.01) |

(52) U.S. Cl.
CPC ............ *G06F 3/011* (2013.01); *G06F 3/0425* (2013.01); *G06T 7/521* (2017.01); *G06T 7/70* (2017.01); *G06V 40/107* (2022.01); *H04N 9/3179* (2013.01); *H04N 9/3194* (2013.01); *G06F 3/017* (2013.01); *G06T 2207/30196* (2013.01)

(58) Field of Classification Search
CPC ........ G06F 3/011; G06F 3/0425; G06F 3/017; G06T 7/521; G06T 7/70; G06T 2207/30196; G06V 40/107; H04N 9/3179; H04N 9/3194
See application file for complete search history.

(56) References Cited

U.S. PATENT DOCUMENTS

| | | | |
|---|---|---|---|
| 9,727,173 B2* | 8/2017 | Mizunuma | G06F 3/04817 |
| 9,846,529 B2* | 12/2017 | Brehmer | G06F 3/0488 |
| 2009/0295712 A1* | 12/2009 | Ritzau | H04M 1/0272 345/156 |
| 2016/0127624 A1* | 5/2016 | Woo | G06F 3/017 348/36 |
| 2017/0123487 A1 | 5/2017 | Hazra et al. | |
| 2018/0113569 A1* | 4/2018 | Pommier | G06F 1/163 |
| 2018/0129284 A1* | 5/2018 | Davis | A61B 5/0261 |
| 2021/0117680 A1 | 4/2021 | Chaudhri et al. | |

* cited by examiner

*Primary Examiner* — David D Davis
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a wearable multimedia device determines a projection area of a laser projector, the projection area having an inner region and a border region at least partially enclosing the inner region. Further, the device projects, using the laser projector, a virtual interface (VI) on a surface. In particular, the device determines, based on sensor data from a camera and/or a depth sensor, a position of the surface relative to the projection area. Further, the device projects the VI on the surface based on the position of the surface. Further, the device determines that a portion of the VI coincides with the border region, and in response, modifies a visual appearance of that portion.

13 Claims, 24 Drawing Sheets

| Streams | Users | Userdevices | Devices |
|---|---|---|---|
| streamid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| streamid | entityID | person | entity 1 |
| ai | userid | place | entity 2 |
| result | entityName | thing | |
| callback | entityType | event | |
| duration | entityAttribute | | |
| accuracy | | | |

FIG. 5

PRESENTING AND ALIGNING LASER PROJECTED VIRTUAL INTERFACES

TECHNICAL FIELD

This disclosure relates generally to laser projected virtual interfaces.

BACKGROUND

High-precision laser scanners (e.g., MEMS scanners) have been developed that can turn any surface into a virtual interface (VI). For example, a laser projected VI can be projected onto the palm of a user's hand or other surface. Three-dimensional (3D) depth sensors (e.g., a time of flight (TOF) camera) can be used to detect user gestures that are interacting with one or more VI elements projected on the surface. In the case of the user's palm, there is very little surface area in which to project a detailed VI. This limited space can limit the number and types of user interactions with the VI, and thus potentially limit the number and types of applications that rely on the VI for input and output.

SUMMARY

Systems, methods, devices and non-transitory, computer-readable storage mediums are disclosed for a laser projected VI.

In general, a wearable multimedia device can include a projector subsystem configured to present information visually to a user in the form of projected light. For example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, a wearable multimedia device can detect the presence of a user's hand in a projection area of the projector subsystem, detect the position and orientation of the user's hand, and project the VI such that the VI aligns with the user's hand. As an example, if the user's hand is on a left side of the projection area, the wearable multimedia device can project the VI towards the left side of the projection area (e.g., such that the VI is projected onto the center of the user's hand). As another example, if the user subsequently shifts her hand to the right side of the projection area, the wearable multimedia device can project the VI towards the right side of the projection area (e.g., such that the VI remains projected onto the center of the user's hand).

In some implementations, the wearable multimedia device can detect when a portion of the user's hand is positioned outside of the projection area of the projector subsystem, and generate a notification to the user instructing her to move that portion of the user's hand back into the projection area. For example, the wearable multimedia device can be configured to project a VI such that it aligns with the center of a user's palm, and scale the size of the VI such that it fits within a particular region of the user's palm. If the user positions her hand such that the region of the user's palm is at least partially outside of the projection area of the projector subsystem, the wearable multimedia device can generate a notification (e.g., audio, video, and/or haptic notification) instructing her to move that region of the user's palm back into the projection area.

In some implementations, the wearable multimedia device can detect when a portion of the user's hand is positioned near the outside of the projection area of the projector subsystem (e.g., but still within the projection area), and generate a notification to the user preemptively instructing her to move that portion of the user's hand back towards the center of the projection area. For example, the wearable multimedia device can be configured to project a VI such that it aligns with the center of a user's palm, and scale the size of the VI such that it fits within a particular region of the user's palm. If the user positions her hand such that the region of the user's palm is positioned at least partially in a border region of the projection area of the projector subsystem (e.g., a border region on the periphery or edge of the projection area), the wearable multimedia device can generate a notification (e.g., audio, video, and/or haptic notification) preemptively instructing her to move that region of the user's palm back towards the center of the projection area.

The implementations described herein can provide various technical benefits. For instance, these techniques allow a user to intuitively ascertain the position of her hand relative to the projection area of the projector subsystem, such that the user can maintain the position of her hand within the projection area. Accordingly, the wearable multimedia device can present a VI on a surface of the user's hand, such that the entirety of the VI can be discerned by the user without interruption. Thus, the user can interact with the wearable multimedia device more quickly and efficiency.

Further, these techniques can reduce the resources expended by the wearable multimedia device during operation. For instance, absent these techniques, a user may have difficulty ascertaining the proper position of her hand relative to the wearable multimedia device. Accordingly, prior to performing any other activity using the wearable multimedia device, she may spend time continuously re-adjusting her hand until she discovers the proper location (e.g., while the wearable multimedia device is expending resources to present the user interface to the user). As another example, if the user moves her hand outside of the projection area, the wearable multimedia device may be unable to present at least a portion of a user interface to the user, thereby interrupting the user's interactions with the wearable multimedia device. Thus, the wearable multimedia device may expend resources—such as computational resources (e.g., CPU cycles), memory resources, storage resources, network resources, and/or battery resources—that might otherwise not need to be expended. By reducing the likelihood that the user improperly positions her hand relative to the wearable multimedia device, the wearable multimedia device can reduce the expenditure of resources and operate in a more efficient manner.

In at least some embodiments, a method includes: determining a projection area of a laser projector of a wearable multimedia device, the projection area having an inner region and a border region at least partially enclosing the inner region; and projecting, using the laser projector, a virtual interface (VI) on a surface, where projecting the VI includes: determining, based on sensor data from at least one of a camera or a depth sensor of the wearable multimedia device, a position of the surface relative to the projection area, projecting the VI on the surface based on the position of the surface, determining that a first portion of the VI coincides with the border region, and responsive to determining that the first portion of the VI coincides with the border region, modifying a visual appearance of the first portion of the VI.

Embodiments can include one or more of the following features.

In some embodiments, modifying the visual appearance of the first portion of the VI can include at least one of: blurring the first portion of the VI, distorting the first portion of the VI, changing a color of the first portion of the VI, or visually degrading the first portion of the VI.

In some embodiments, the method can further include: responsive to determining that the first portion of the VI coincides with the border region, performing one of: presenting an audio alert using a speaker of the wearable multimedia device, or presenting a haptic alert using a haptic device of the wearable multimedia device.

In some embodiments, the projection area can correspond to a projection area of the laser projector.

In some embodiments, the border region can be the portion of the projection area other than the inner region.

In some embodiments, the inner region can be centered in the projection area.

In some embodiments, the border region can define a polygonal border around the inner region.

In some embodiments, the polygonal border can be at least one of a rectangle, a trapezoid, a parallelogram, or a rhombus.

In some embodiments, the border region can define a curved border around the inner region.

In some embodiments, the border region can entirely enclose the inner region.

In some embodiments, projecting the VI on the surface can include: determining a first registration point of the VI, determining a second registration point on the surface, and projecting the VI on the surface such that the first registration point of the VI coincides with the second registration point of the surface.

In some embodiments, projecting the VI on the surface can include: determining a plurality of first registration points of the VI, determining a plurality second registration points on the surface, and projecting the VI on the surface such that each of the first registration points of the VI coincides with a corresponding one of the second registration points of the surface.

In some embodiments, the surface can be a surface of a hand of a user.

In some embodiments, the surface can be a palm of the hand.

In at least some embodiments, a wearable multimedia device includes: at least one processor; and memory storing instructions that, when executed by the at least one processor, cause the at least one processor to perform various operations, including one or more of the methods described herein.

In at least some embodiments, one or more non-transitory computer-readable media store instructions that, when executed by at least one processor, cause the at least one processor to perform operations, including one or more of the methods described herein.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

The same reference symbol used in various drawings indicates like elements.

DETAILED DESCRIPTION

Example Wearable Multimedia Device

Figure 1:
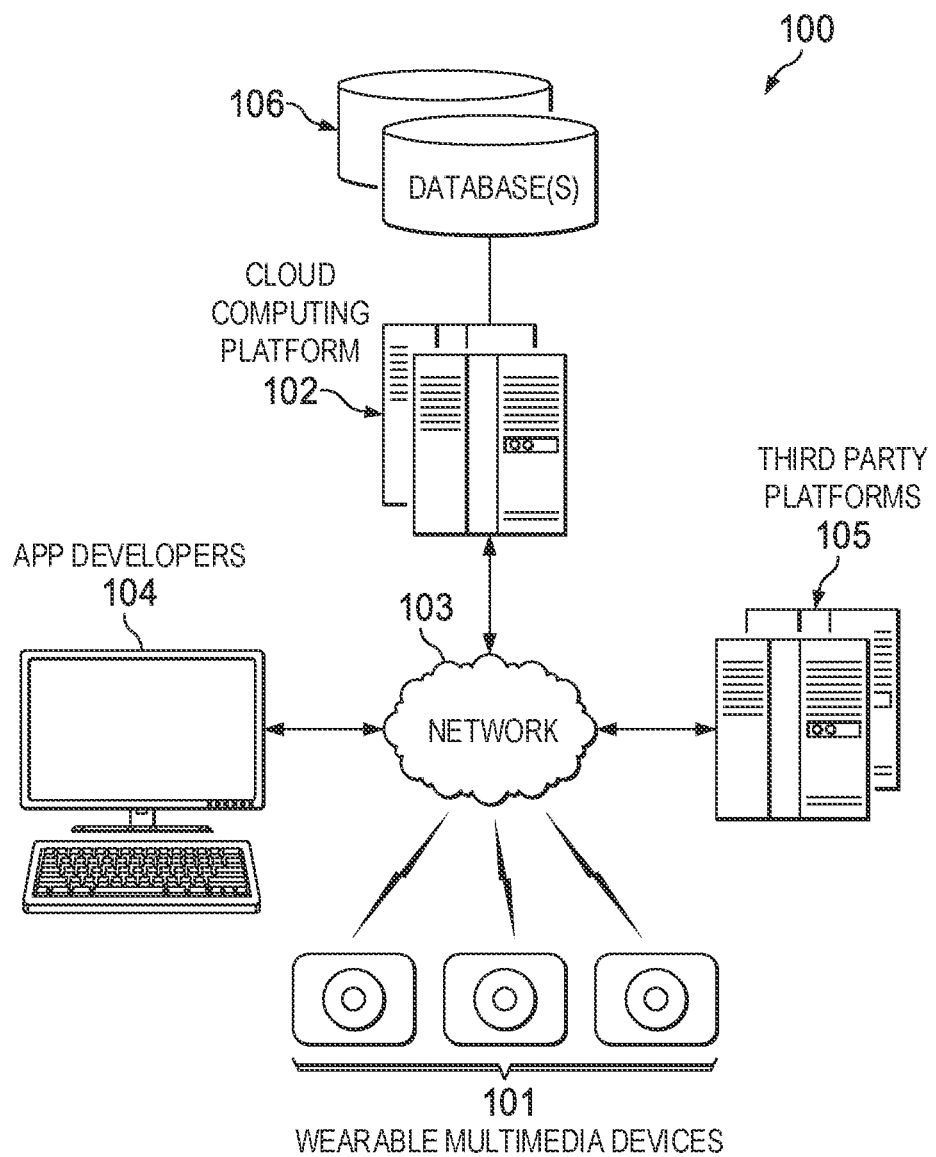
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured, optionally cropped (e.g., to protect privacy), and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allows various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
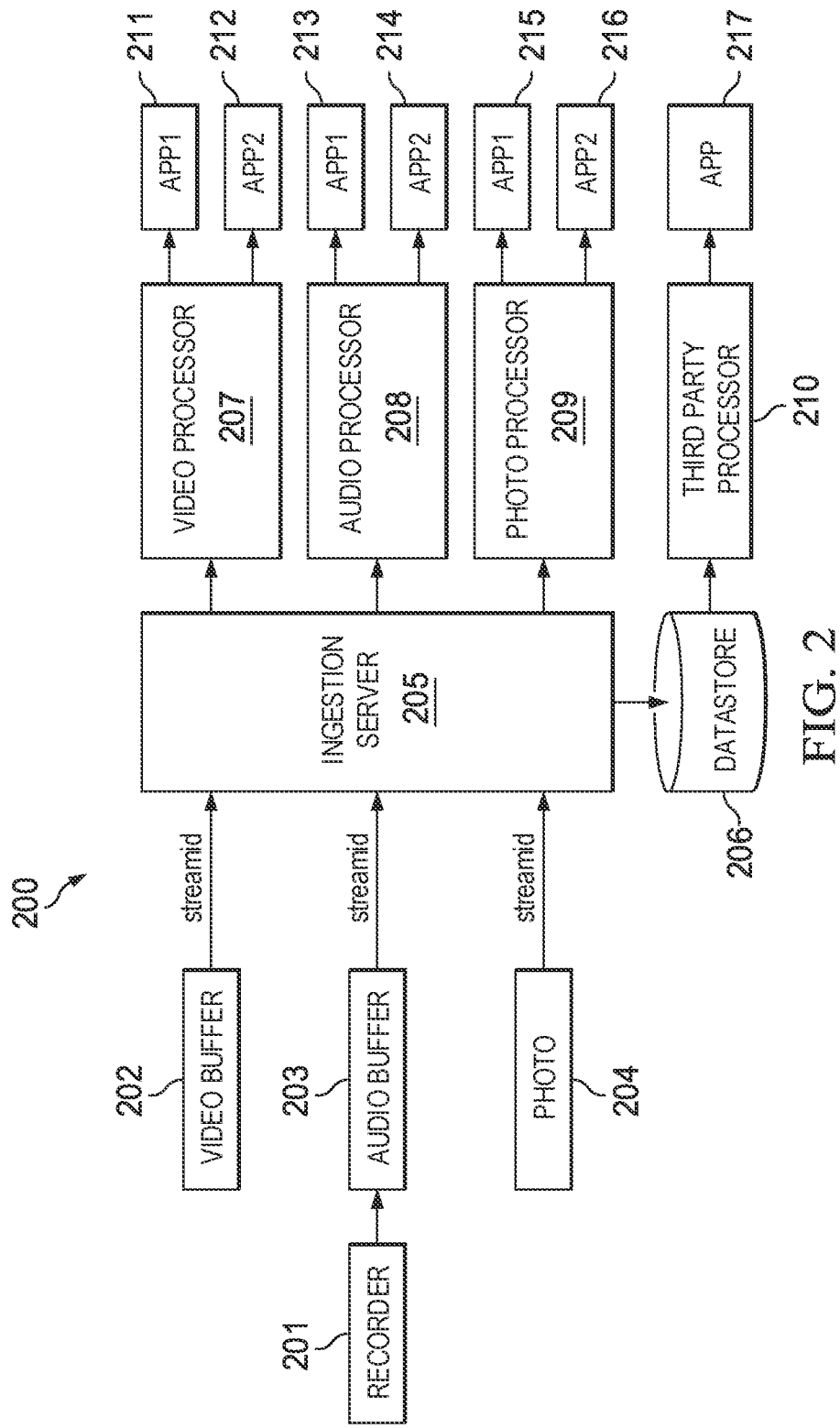
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
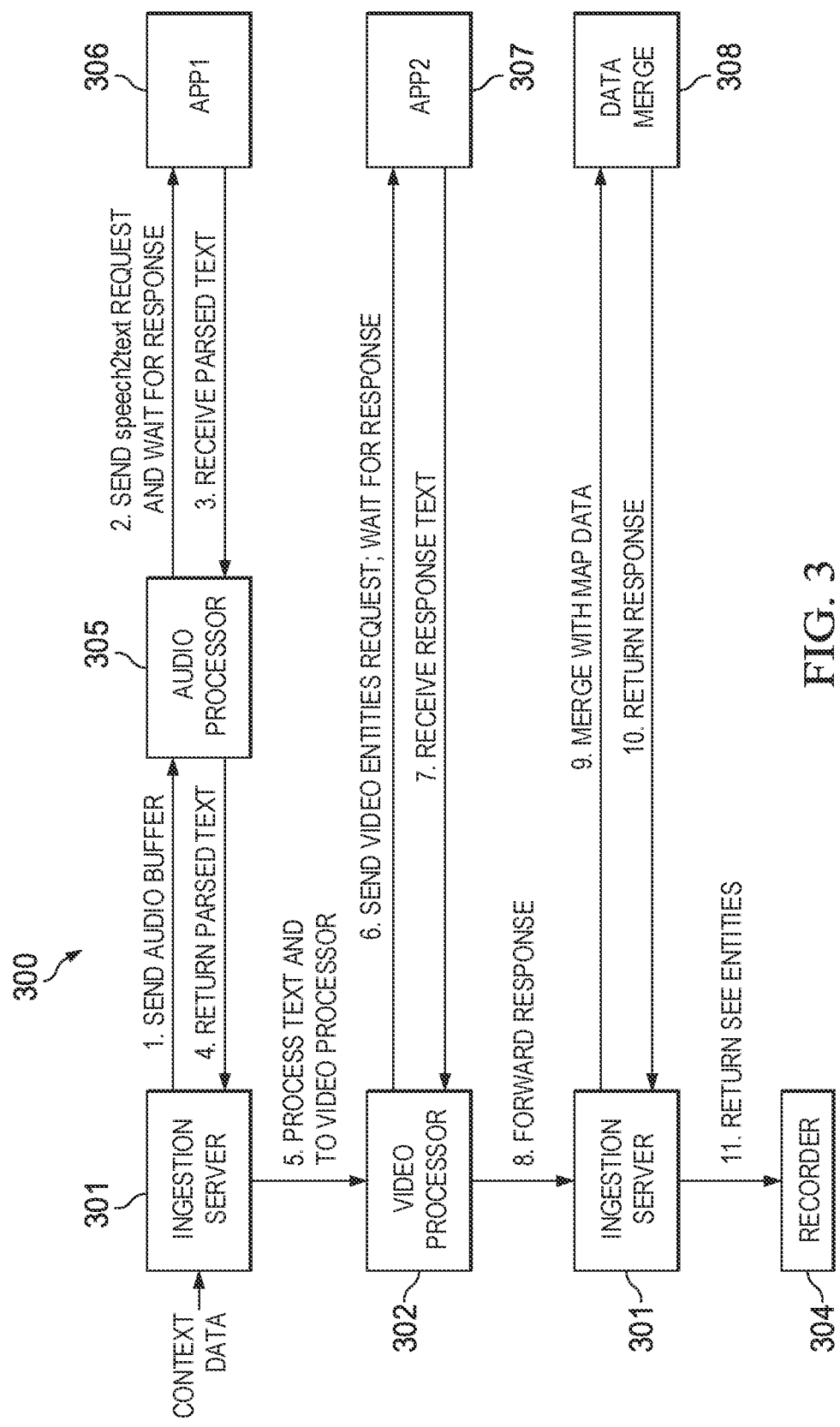
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
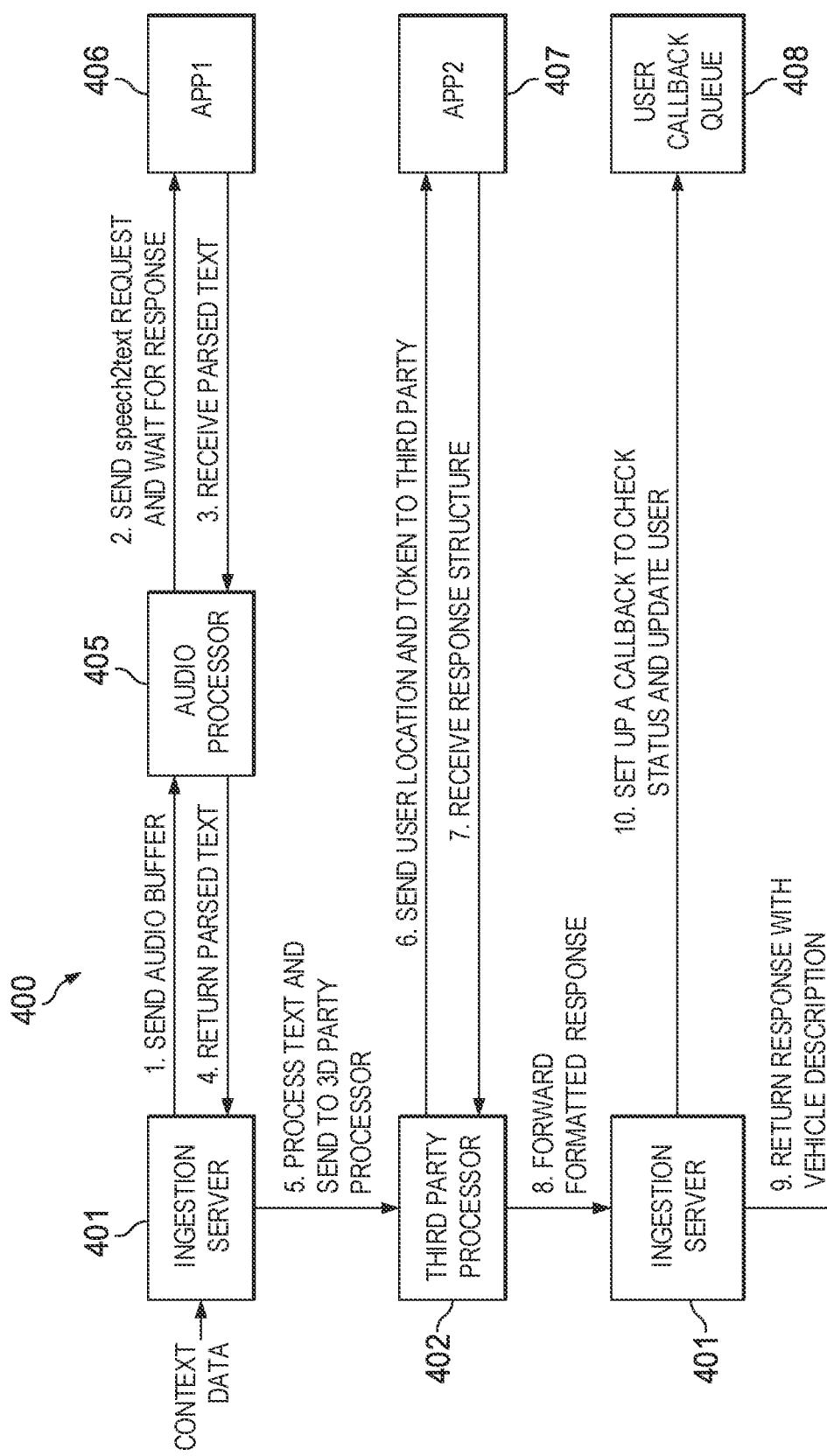
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application).

In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
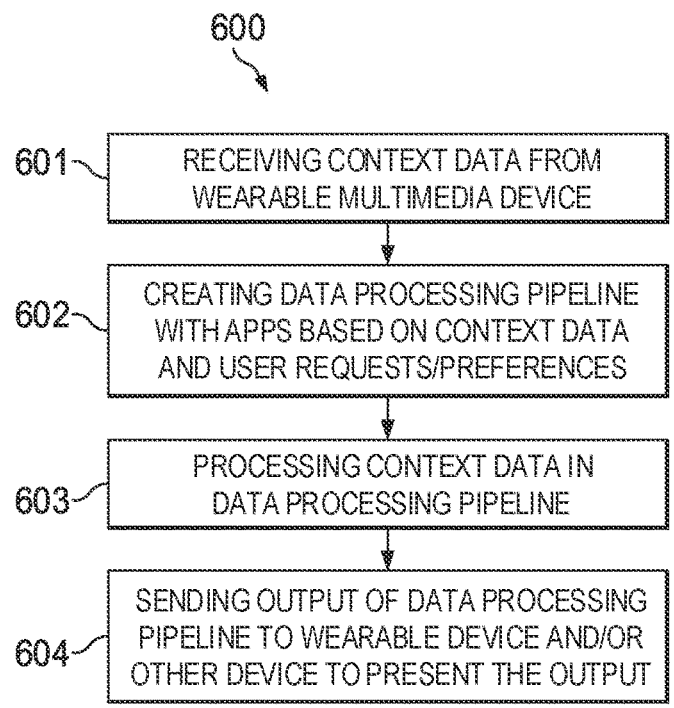
FIG. 6 is a flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
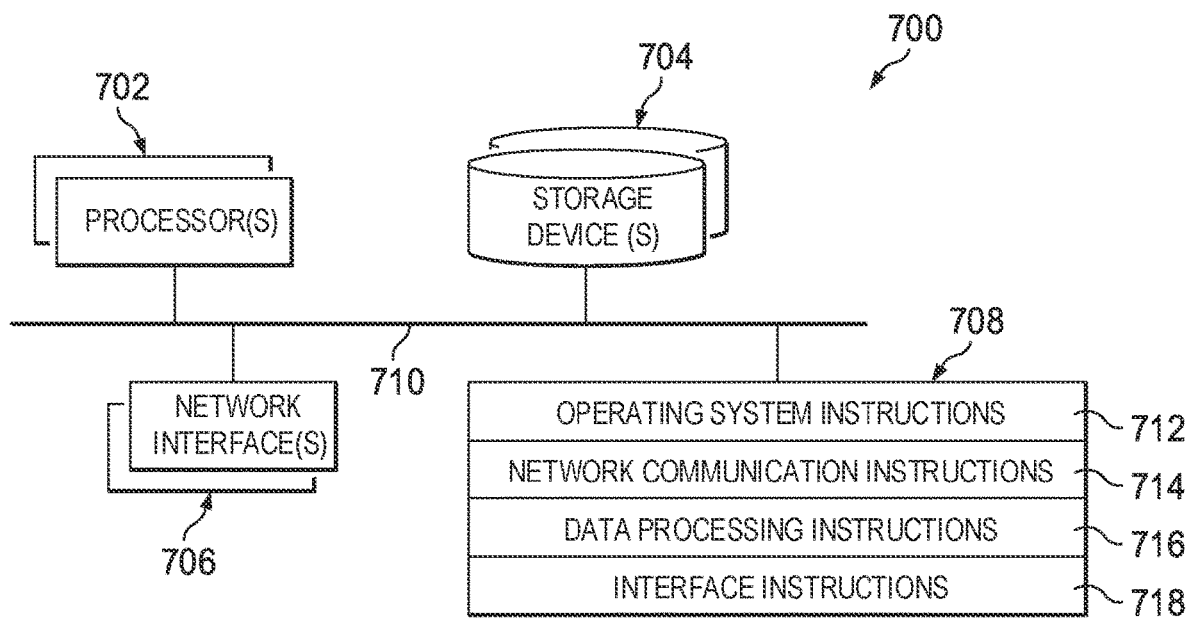
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows®

NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
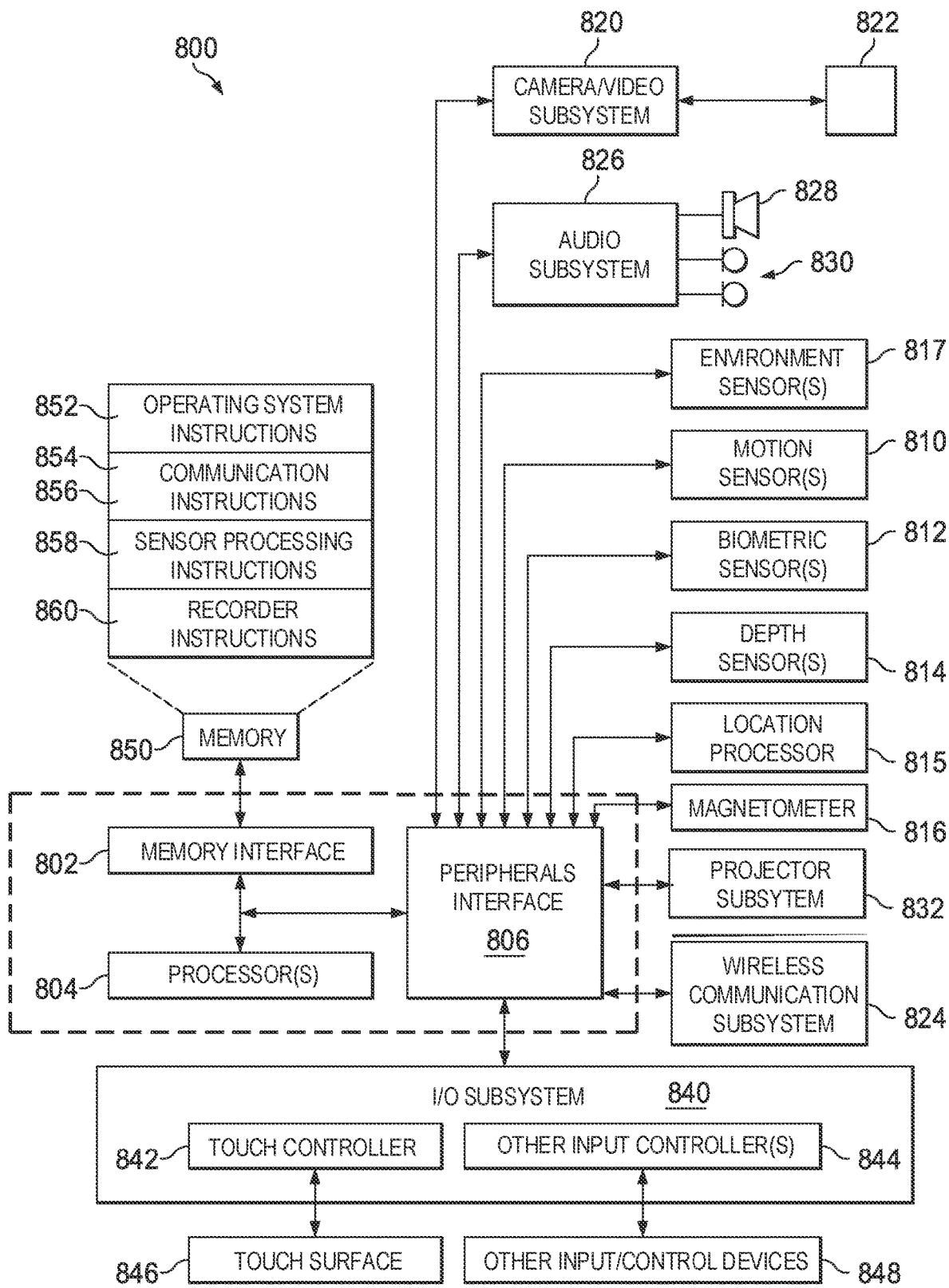
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. In some implementations, a user can perform a gesture using a single hand at a time (e.g., using the hand upon which the VI is projected or her other hand). In some implementations, a user can perform a gesture using two hands concurrently. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, the wearable multimedia device 101 can detect the type of surface that is positioned in the projection area of the projector subsystem 832 (e.g., using the camera/video subsystems 820, environment sensor(s) 817, depth sensor(s) 814, etc.), and adjust one or more characteristics of the VI based on the type of surface that is detected. This can be beneficial, for example, in improving the legibility and usability of the VI in different operating environments and/or use cases.

As an example, the wearable multimedia device 101 can detect that a surface of the user's hand (e.g., the user's palm) is positioned in the projection area of the projector subsystem. As the surface area of the user's hand may be constrained (e.g., compared to a surface of a desk or wall), the wearable multimedia device 101 can reduce the overall size of the VI, such that the VI can be presented in its entirety on the user hand. Further, the wearable multimedia device 101 can adjust the size, colors, shapes, spacing, complexity, and/or other visual characteristics of the use interface elements of the VI, such that the user can readily interpret and/or interact with each of the user interface elements.

As an example, the wearable multimedia device 101 can detect that a surface of a wall, table, desk, etc. is positioned in the projection area of the projector subsystem. As the surface area of a wall, table, desk, etc. may be larger (e.g., compared to a surface of the user's hand), the wearable multimedia device 101 can increase the overall size of the VI to make better use of the larger projection surface. Further, the wearable multimedia device 101 can adjust the size, colors, shapes, spacing, complexity, and/or other visual characteristics of the use interface elements of the VI, such that the user can readily interpret and/or interact with each of the user interface elements.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
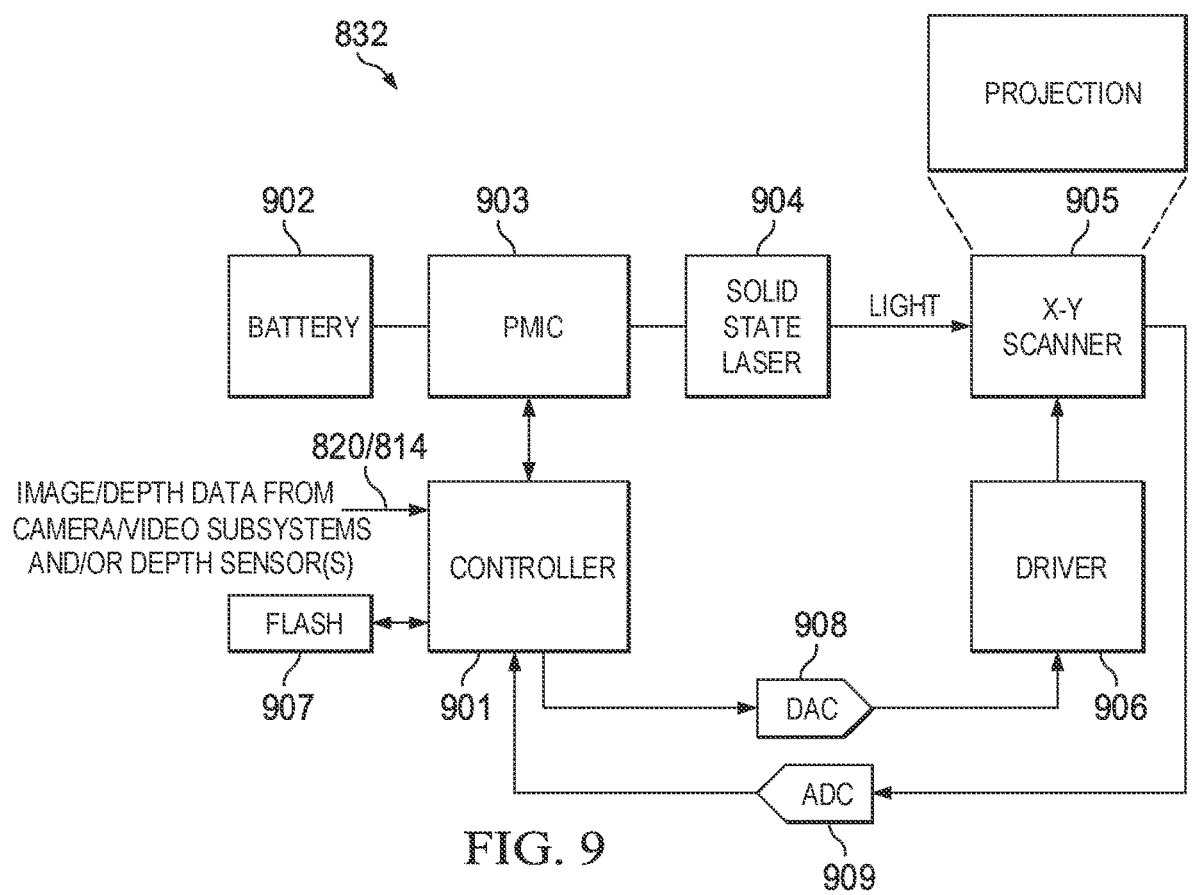
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives text, images, videos, colors, patterns, and/or any other graphical information on the surface.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. In some implementations, a user can perform a gesture using a single hand at a time (e.g., using the hand upon which the VI is projected or her other hand). In some implementations, a user can perform a gesture using two hands concurrently. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of content (e.g., content including video, images, audio, text, etc.), the viewing of content, the editing of content, the storing and transmission data, and/or any other operation described herein. As another example, at least some of the user interface elements and/or commands can be used to exchange messages (e.g., emails, chat messages, text messages, etc.) with other users. As another example, at least some of the user interface elements and/or commands can be used to generate, obtain, view, edit, transmit, and/or store mapping data. As another example, at least some of the user interface elements and/or commands can be used to generate, obtain, view, edit, transmit, and/or store calendar data.

In some implementations, a wearable multimedia device can detect the presence of a user's hand in a projection area of the projector subsystem, detect the position and orientation of the user's hand, and project the VI such that the VI aligns with the user's hand.

As an example, the projector subsystem 832 can be configured to project light into a particular projection area (e.g., a region of space within which the projector subsystem 832 can focus and/or direct light to form visual content that can be discerned by the user). For instance, referring to FIG. 9, the projection area can be the region of space in which the X-Y scanner 905 can steer a laser beam to form projected images on a surface. In some implementation, the projection area may also be referred to as a projection range of the projector subsystem 832 (e.g., the range within which the projector subsystem 832 can focus and/or direct light to form visual content that can be discerned by the user).

Further, the wearable multimedia device 101 can be configured to detect objects that are positioned in the projection area. For example, the wearable multimedia device 101 can obtain sensor data from one or more sensors (e.g., the camera/video subsystems 820, environment sensor(s) 817, depth sensor(s) 814, etc.), and based on the sensor data, detect the whether the user has positioned a hand in the projection area. Further, based on the sensor data, the wearable multimedia device 101 can determine the position and the orientation of the user's hand in the projection area.

The wearable multimedia device 101 can project light differently, depending on the position and orientation of the user's hand. For instance, if the user's hand is on a left side of the projection area, the wearable multimedia device can project the VI towards the left side of the projection area (e.g., such that the VI is projected onto the center of the user's hand). Further, if the user subsequently shifts her hand to the right side of the projection area, the wearable multimedia device 101 can project the VI towards the right side of the projection area (e.g., such that the VI remains projected onto the center of the user's hand).

In some implementations, the wearable multimedia device 101 can detect when a portion of the user's hand is positioned outside of the projection area of the projector subsystem 832, and generate a notification to the user instructing her to move that portion of the user's hand back into the projection area. For example, the wearable multimedia device 101 can be configured to project a VI such that it aligns with the center of a user's palm, and scale the size of the VI such that it fits within a particular region of the user's palm. If the user positions her hand such that the region of the user's palm is at least partially outside of the projection area of the projector subsystem 832, the wearable multimedia device 101 can generate a notification (e.g., audio, video, and/or haptic notification) instructing her to move that region of the user's palm back into the projection area.

In some implementations, the wearable multimedia device 101 can detect when a portion of the user's hand is positioned near the outside of the projection area of the projector subsystem 832 (e.g., but still within the projection area), and generate a notification to the user preemptively instructing her to move that portion of the user's hand back towards the center of the projection area. For example, the wearable multimedia device 101 can be configured to project a VI such that it aligns with the center of a user's palm, and scale the size of the VI such that it fits within a particular region of the user's palm. If the user positions her hand such that the region of the user's palm is positioned at least partially in a border region of the projection area of the projector subsystem 832 (e.g., a border region on the periphery or edge of the projection area), the wearable multimedia device 101 can generate a notification (e.g., audio, video, and/or haptic notification) preemptively instructing her to move that region of the user's palm back towards the center of the projection area.

The implementations described herein can provide various technical benefits. For instance, these techniques allow a user to intuitively ascertain the position of her hand relative to the projection area of the projector subsystem 832, such that the user can maintain the position of her hand within the projection area. Accordingly, the wearable multimedia device 101 can present a VI on a surface of the user's hand, such that the entirety of the VI can be discerned by the user without interruption. Thus, the user can interact with the wearable multimedia device 101 more quickly and efficiency.

Further, these techniques can reduce the resources expended by the wearable multimedia device 101 during operation. For instance, absent these techniques, a user may have difficulty ascertaining the proper position of her hand relative to the wearable multimedia device 101. Accordingly, prior to performing any other activity using the wearable multimedia device 101, she may spend time continuously re-adjusting her hand until she discovers the proper location (e.g., while the wearable multimedia device 101 is expending resources to present the user interface to the user). As another example, if the user moves her hand outside of the projection area, the wearable multimedia device 101 may be unable to present at least a portion of a user interface to the user, thereby interrupting the user's interactions with the wearable multimedia device 101. Thus, the wearable multimedia device 101 may expend resources—such as computational resources (e.g., CPU cycles), memory resources, storage resources, network resources, and/or battery resources—that might otherwise not need to be expended. By reducing the likelihood that the user improperly positions her hand relative to the wearable multimedia device 101, the wearable multimedia device can reduce the expenditure of resources and operate in a more efficient manner 101.

Figure 10A:
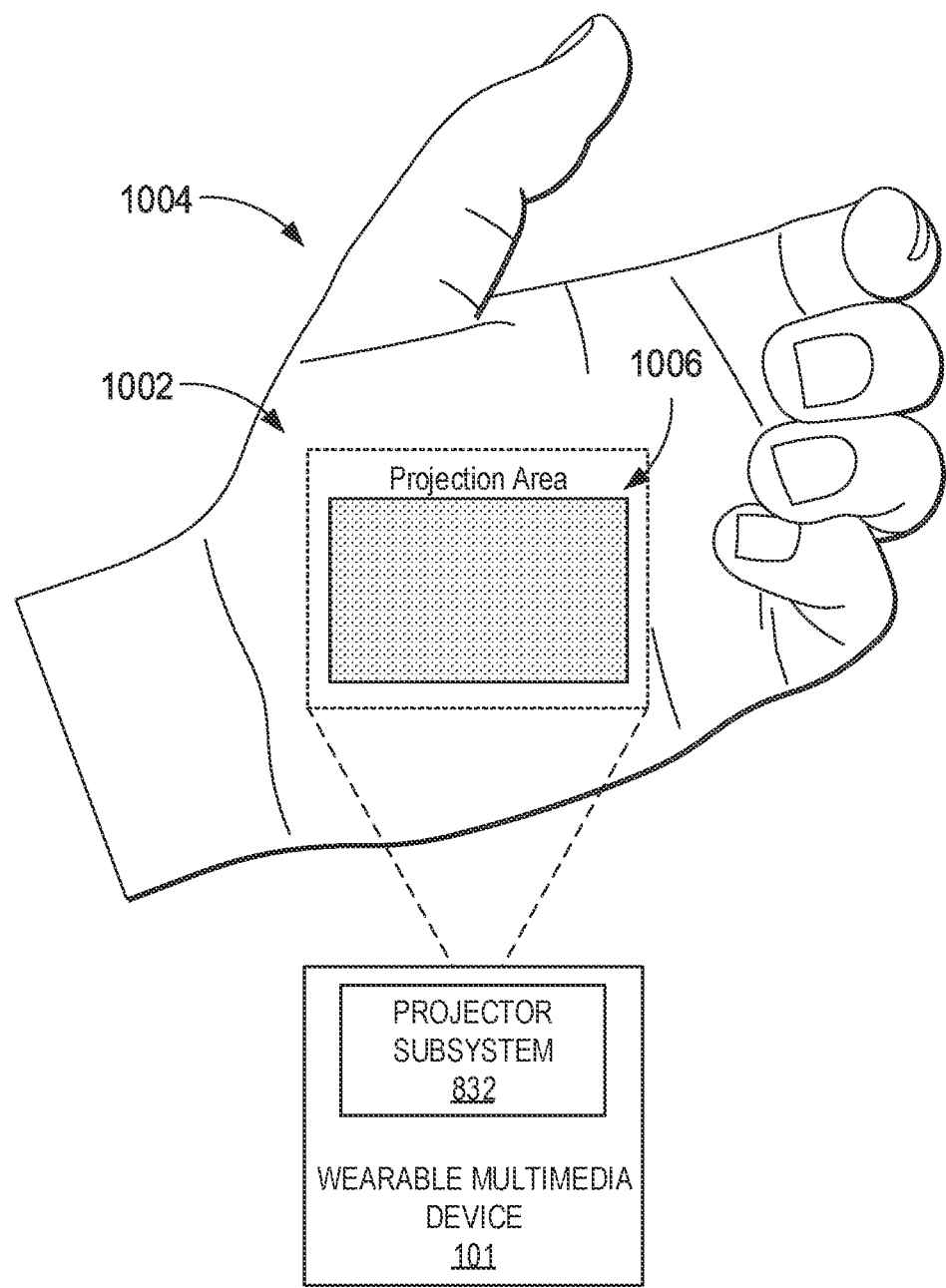
FIGS. 10A and 10B are diagrams of example operations performed by a wearable multimedia device to present a virtual interface to the user.
Figure 10B:
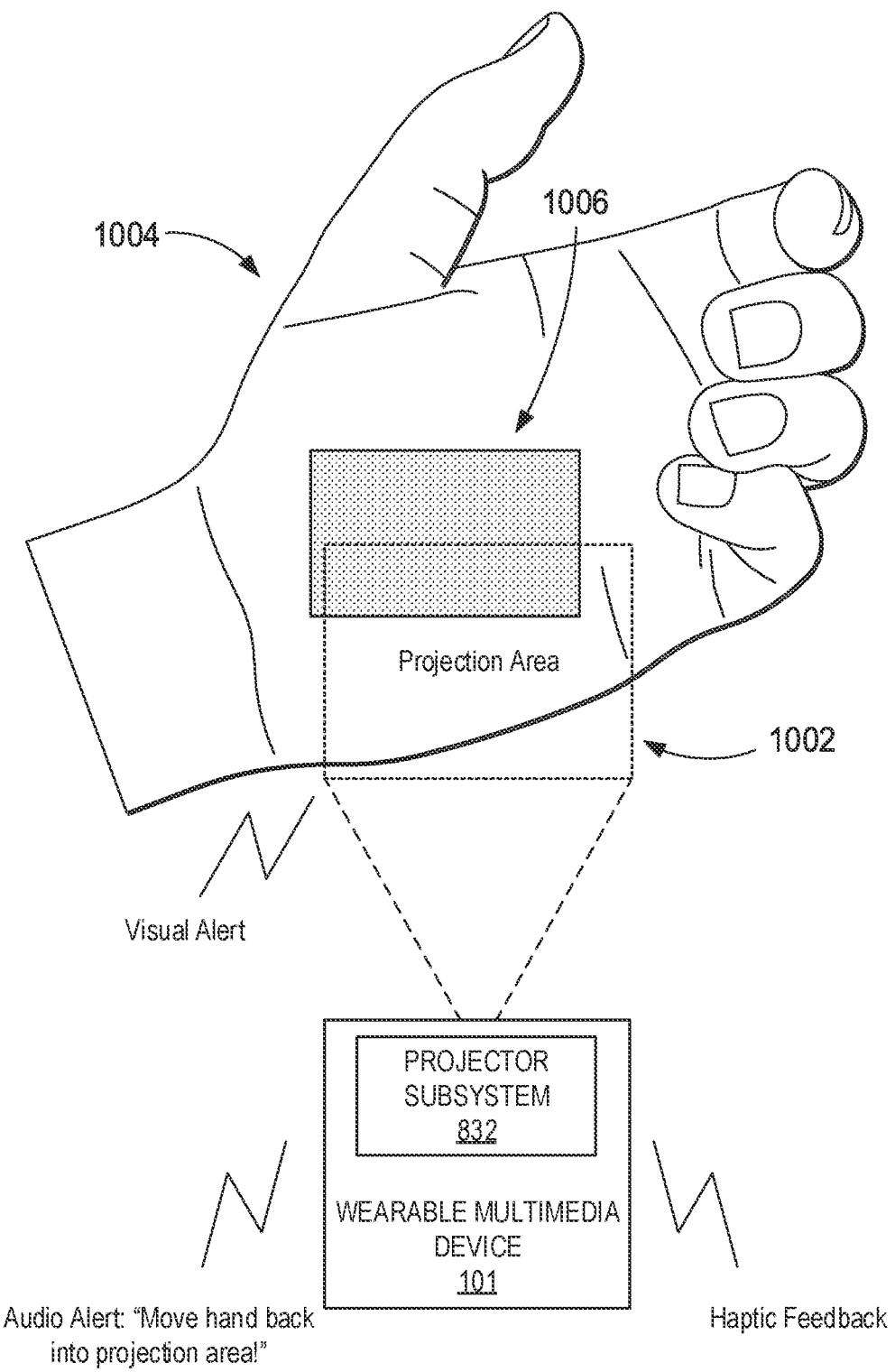

FIGS. 10A and 10B show an example implementation of the techniques described above.

As shown in FIG. 10A, a projector subsystem 832 can be configured to project light into a projection area 1002 (represented as a dashed rectangular outline). Although the projection area 1002 is depicted in FIG. 10A as a rectangular region of space, in practice, the projection area 1002 can be any shape (e.g., polygonal, curved, and/or a combination thereof).

In this example, the user has positioned her hand 1004 within the projection area 1002, such that a portion 1006 of her palm (represented as a shaded rectangle) is positioned entirely within the projection area 1002. In some implementations, the wearable multimedia device 101 can be configured to project a VI on the surface of the user's hand, such that the VI is aligned with and positioned entirely within the portion 1006 of the user's palm. Although the portion 1006 of the palm is depicted in FIG. 10A as a rectangular surface, in practice, the portion 1006 of the user's palm can be any shape (e.g., polygonal, curved, and/or a combination thereof).

In the example shown in FIG. 10B, the user has moved her hand away from the projection area 1002, such that the portion 1006 of the user's palm is no longer positioned entirely within the projection area 1002. Accordingly, the wearable multimedia device 101 may be unable to present a VI in its entirety on the surface of the user's hand 1004.

The wearable multimedia device 101 can obtain sensor data regarding the position and/or orientation of the user's hand (e.g., using the camera/video subsystems 820, environment sensor(s) 817, depth sensor(s) 814, etc.), and determine whether the portion 1006 of the user's palm is no longer positioned entirely within the projection area 1002. In response, the wearable multimedia device 101 can generate a notification alerting the user that her hand is improperly positioned relative to the wearable multimedia device 101 (e.g., such that the user can adjust the position of her hand).

In some implementations, the notification can include an audio alert (e.g., a sound generated by the speaker 828 of the wearable multimedia device 101, such as a sound effect, a tone, and/or spoken words). In some implementations, the notification can include haptic feedback (e.g., vibrations, pulses, or other haptic feedback generated by haptic motor of the wearable multimedia device 101). In some implementations, the notification can include visual content (e.g., light projected by the projector subsystem 832 onto the surface of the user's hand). Example visual alerts are further described with reference to FIGS. 15A-15C.

As described above, a wearable multimedia device 101 can detect the position and orientation of a user's hand, and project the VI such that the VI aligns with the user's hand. In some implementations, this can be performed, at least in part, by determining the location one or more registration points on the user's hand, and projecting the VI such that one or more corresponding registration points on the VI coincide with the one or more registration points on the user's hand.

Figure 11A:
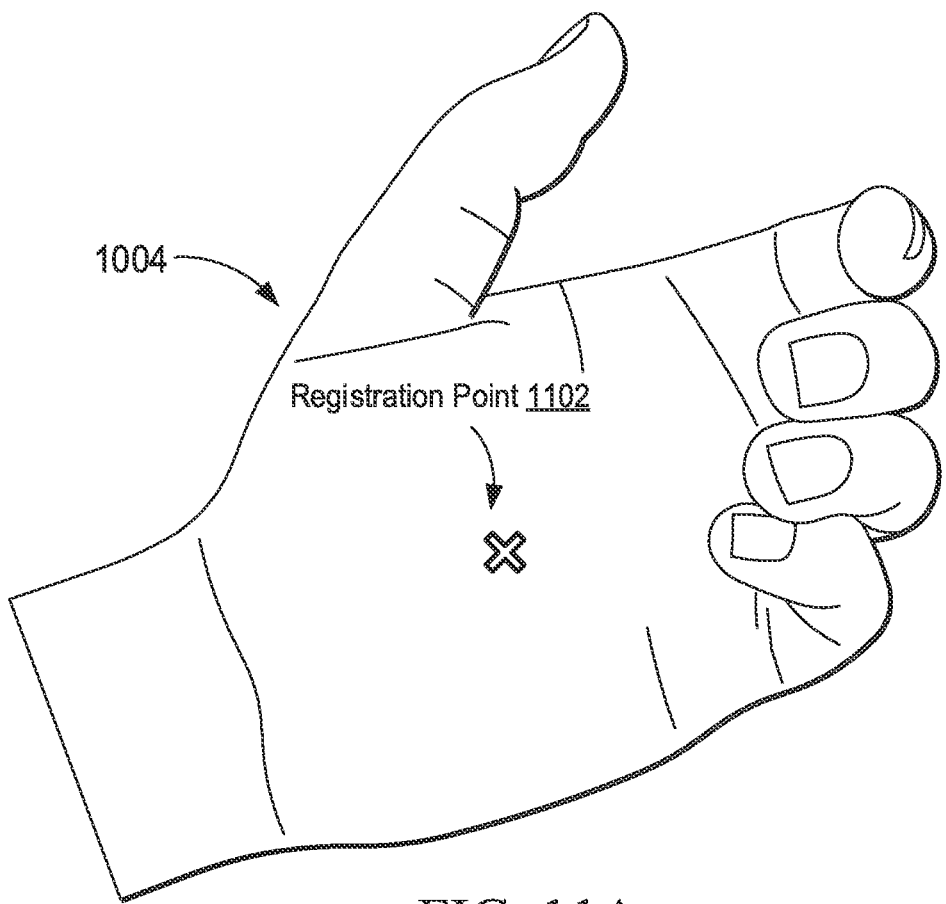
FIGS. 11A-11E are diagrams of further example operations performed by a wearable multimedia device to present a virtual interface to the user.

As an example, as shown in FIG. 11A, the wearable multimedia device 101 can detect a registration point 1102 (represented by an "X" symbol) on the surface of the user's hand 1004. In some implementations, the registration point 1102 can be a point that is in the region of the user's hand 1004 upon which a VI 1104 is to be projected. As an example, the registration point 1102 can be positioned in the portion 1006 of the user's palm (e.g., as described with reference FIGS. 10A and 10B), such as the center of the portion 1006. In some implementations, the wearable multimedia device 101 can detect the registration point 1102 by obtaining sensor data (e.g., using the camera/video subsystems 820, environment sensor(s) 817, depth sensor(s) 814, etc.), and identify one or more features of the user's hand that are indicative of the registration point 1102.

Figure 11B:
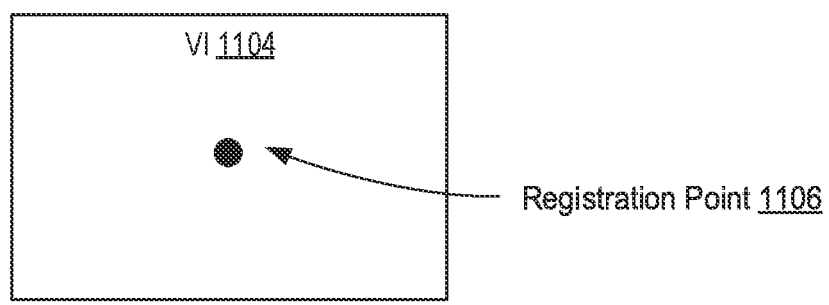

Further, as shown in FIG. 11B, the wearable multimedia device 101 can determine a corresponding registration point 1106 (represented by a circle symbol) in the VI 1104. As an example, the registration point 1106 can be positioned in the center of the VI 1104.

Figure 11C:
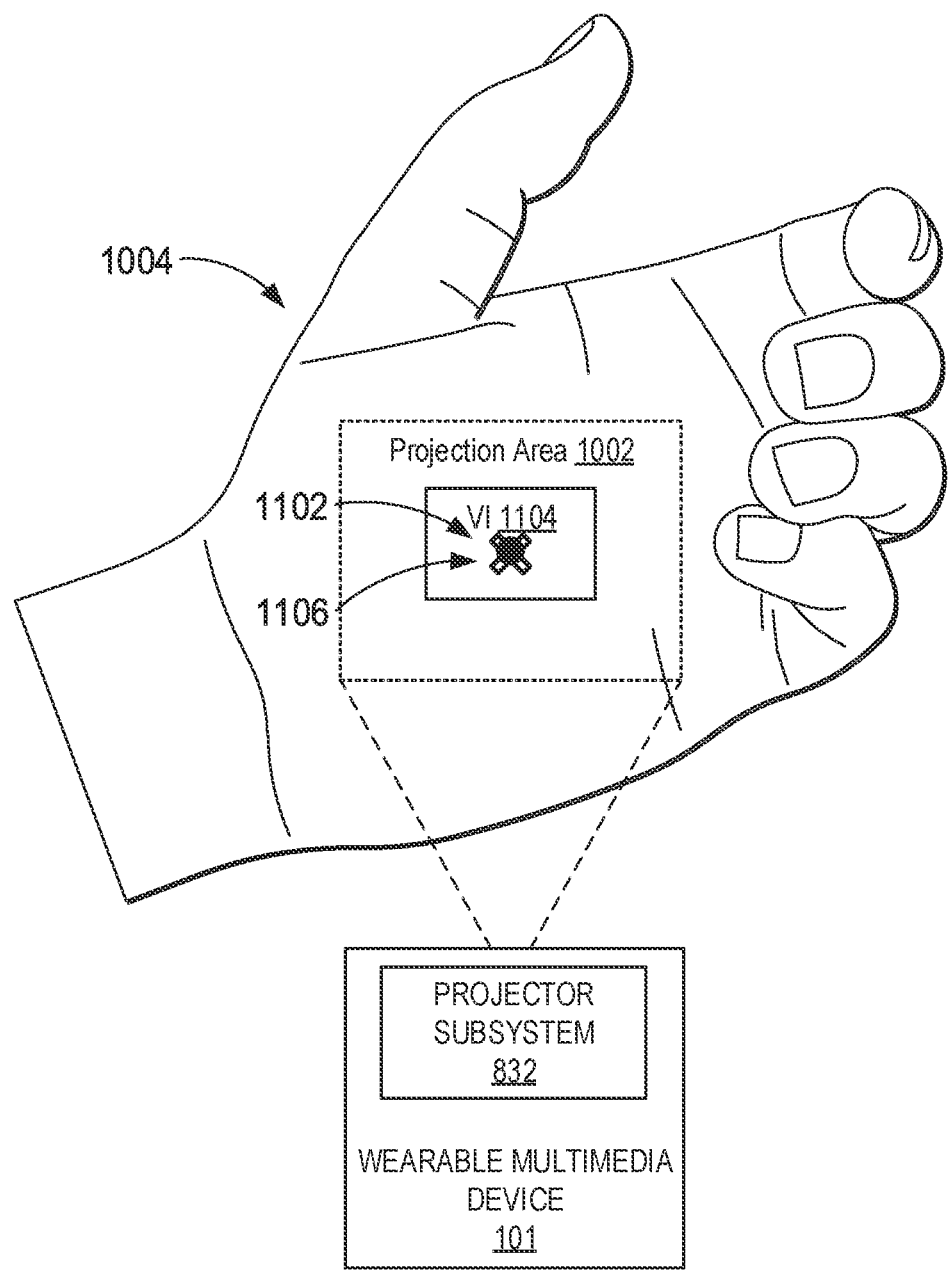

As shown in FIG. 11C, the wearable multimedia device 101 can project the VI 1104 onto the surface of the user's hand 1004, such that the registration point 1102 coincides with the registration point 1106. Further, the wearable multimedia device 101 can scale the size of the VI 1104 on the user's hand 1004, such that the entirety of the VI 1104 fits within the projection area 1002 and/or the portion 1006 of the user's hand 1104.

Figure 11D:
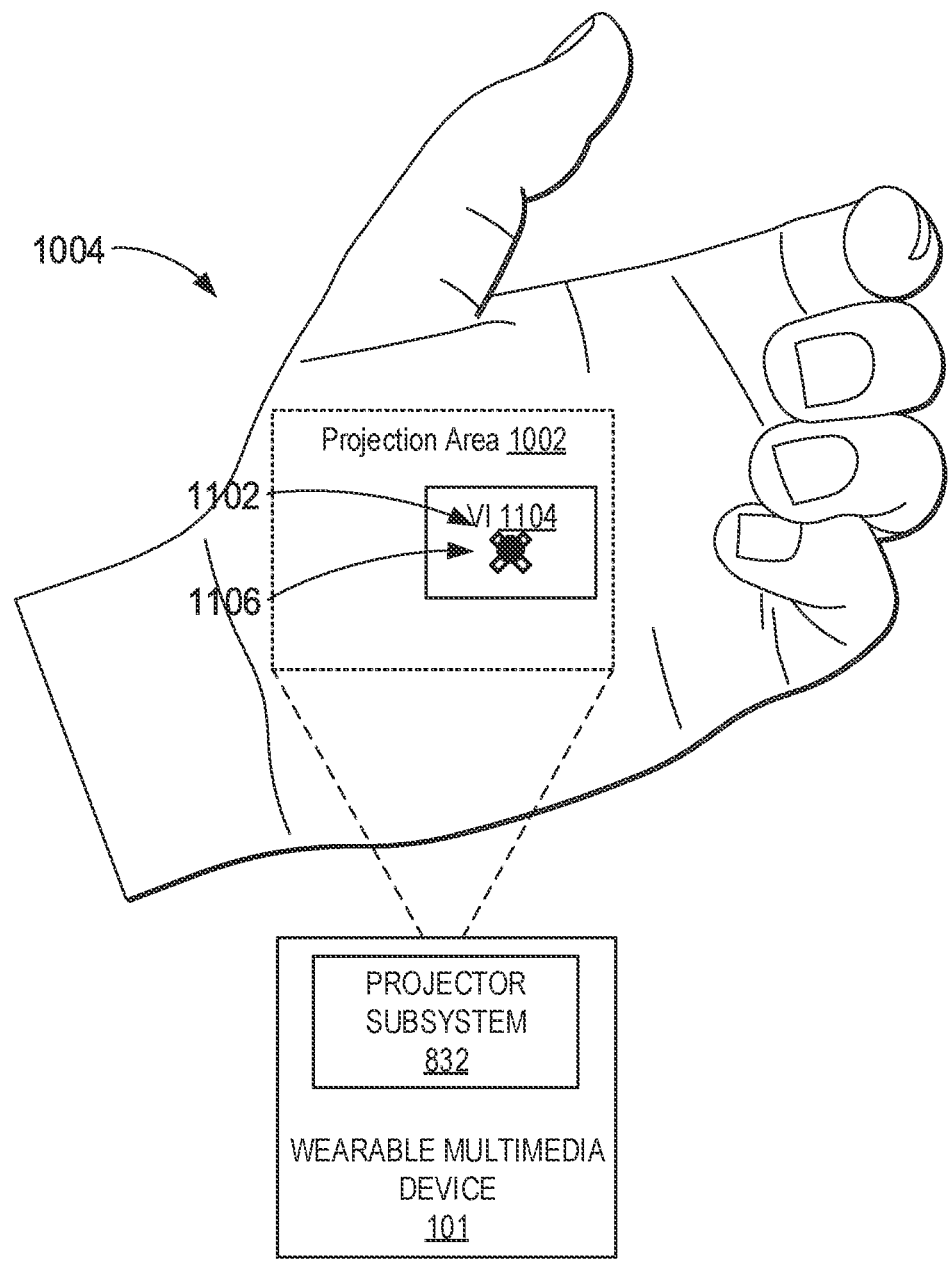

Further, the wearable multimedia device 101 can adjust the projection of the VI 1104 based on the movement of the user's hand 1004. For example, as shown in FIG. 11D, if the user moves her hand 1004 to the right, the wearable multimedia device 101 can detect the movement of the registration point 1102 on the user's hand 1004 (e.g., using the camera/video subsystems 820, environment sensor(s) 817, depth sensor(s) 814, etc.). Further, the wearable multimedia device 101 can adjust the projection of the VI 1104, such that the registration point 1102 and the registration 1106 continue to align with one another. Accordingly, from the perspective of the user, the VI 1104 appears to remain on the same position on her hand 1004, even after she has moved her hand 1004. Further still, if the user also moved her hand closer or farther from the wearable multimedia device 101, the wearable multimedia device 101 can also adjust the projection of the VI 1104, such that the VI 1104 appears to be the same size on the user's hand 1004.

Figure 11E:
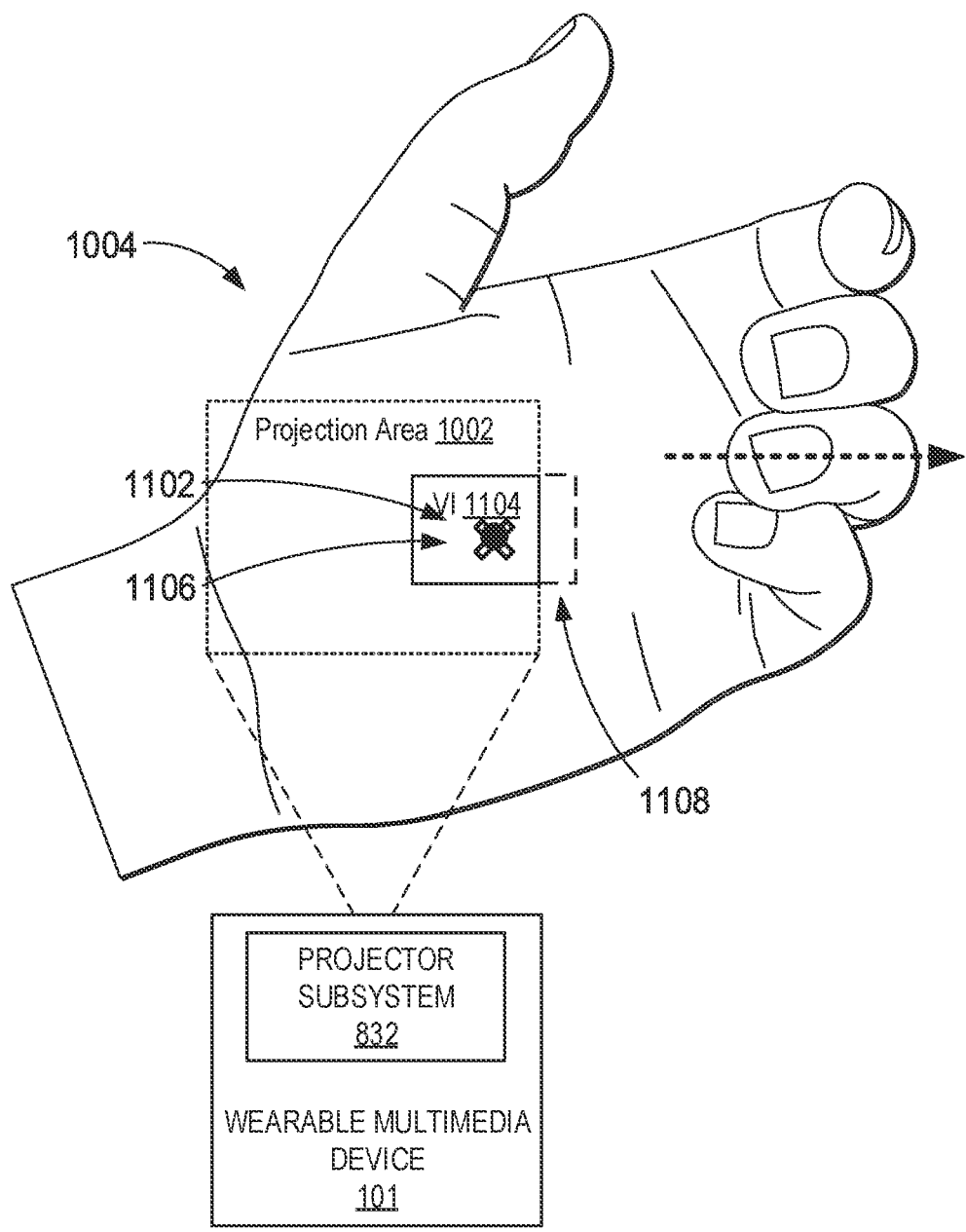

As described above, in some implementations, a user may move her hand 1004 such that the wearable multimedia device 101 is unable to project the entirety of the VI 1104 on the user's hand 1004. For instance, in the example shown in FIG. 11E, the user has moved her hand further to the right. As described above, the wearable multimedia device 101 can detect the movement of the registration point 1102 on the user's hand 1004 (e.g., using the camera/video subsystems 820, environment sensor(s) 817, depth sensor(s) 814, etc.), and adjust the projection of the VI 1104, such that the registration point 1102 and the registration 1106 continue to align with one another. However, in this example, the wearable multimedia device 101 is unable to project the entirety of the VI 1104 onto the user's hand 1004, as a portion of the VI 1104 (e.g., a portion 1108) would extend beyond the projection area 1002 of the projector subsystem 832. As described above, in response, the wearable multimedia device 101 can generate a notification (e.g., audio, video, and/or haptic notification) instructing the user to move her hand 1004 back towards the projection area, such that that the wearable multimedia device 101 can project the entirety of the VI 1104 onto the user's hand 1004.

In some implementations, a wearable multimedia device 101 can align a VI with the user's hand, at least in part, by determining the location multiple registration points on the user's hand (e.g., two, three, four, or more), and projecting the VI such that each of the registration points on the VI coincides with a corresponding registration point on the user's hand. This can be beneficial, for example, in providing a more consistent and/or accurate alignment between the VI and the user's hand (e.g., compared to using a single registration point on each of the user's hand and the VI).

Figure 12A:
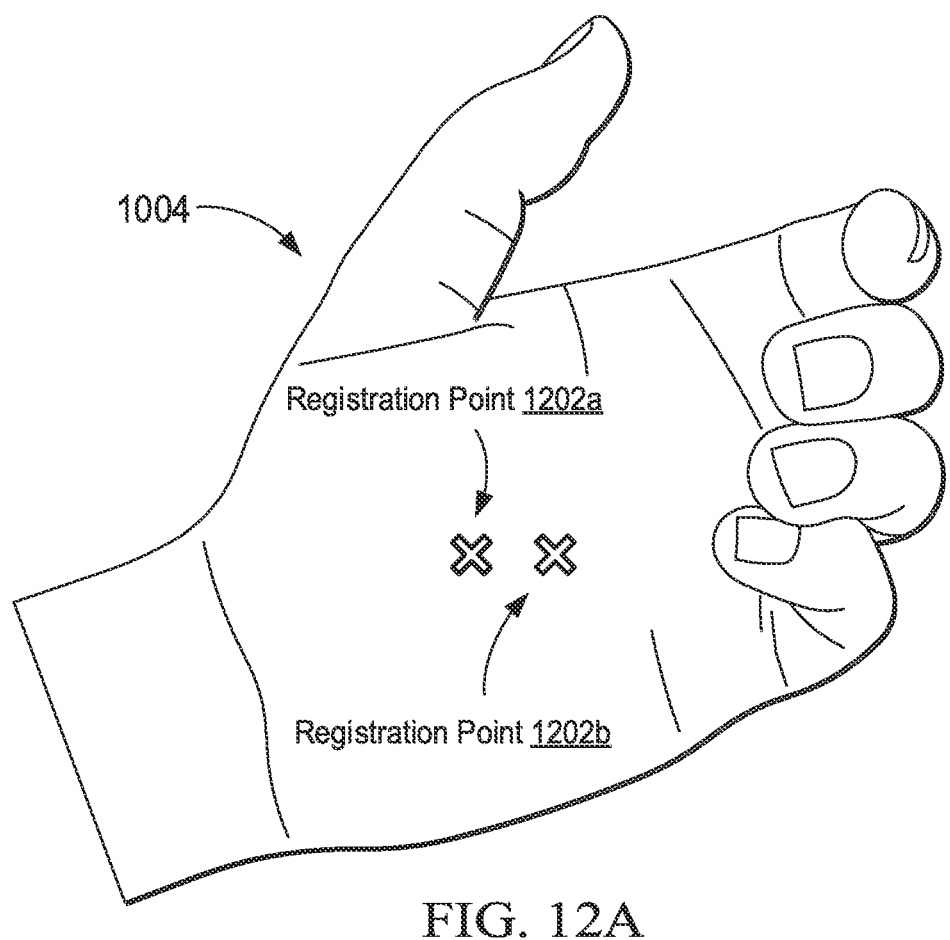
FIGS. 12A-12C are diagrams of further example operations performed by a wearable multimedia device to present a virtual interface to the user.

As an example, as shown in FIG. 12A, the wearable multimedia device 101 can detect two registration points 1202a and 1202b (represented by "X" symbols) on the surface of the user's hand 1004. In some implementations, the registration points 1202a and 1202b can be points that are in the region of the user's hand 1004 upon which a VI 1204 is to be projected. As an example, the registration points 1202a and 1202b can be positioned in the portion 1006 of the user's palm (e.g., as described with reference FIGS. 10A and 10B). In some implementations, the wearable multimedia device 101 can detect the registration points 1202a and 1202b by obtaining sensor data (e.g., using the camera/video subsystems 820, environment sensor(s) 817, depth sensor(s) 814, etc.), and identify one or more features of the user's hand that are indicative of the registration points 1202a and 1202b.

Figure 12B:
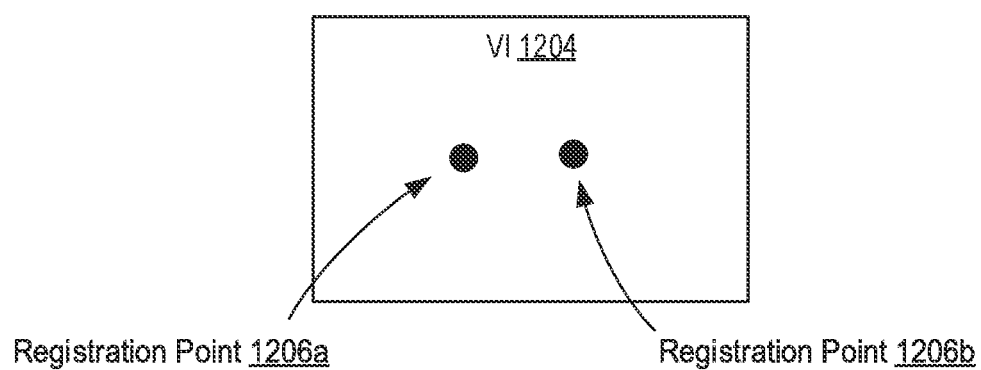

Further, as shown in FIG. 12B, the wearable multimedia device 101 can determine corresponding registration points 1206a and 1206b (represented by circle symbols) in the VI 1204.

Figure 12C:
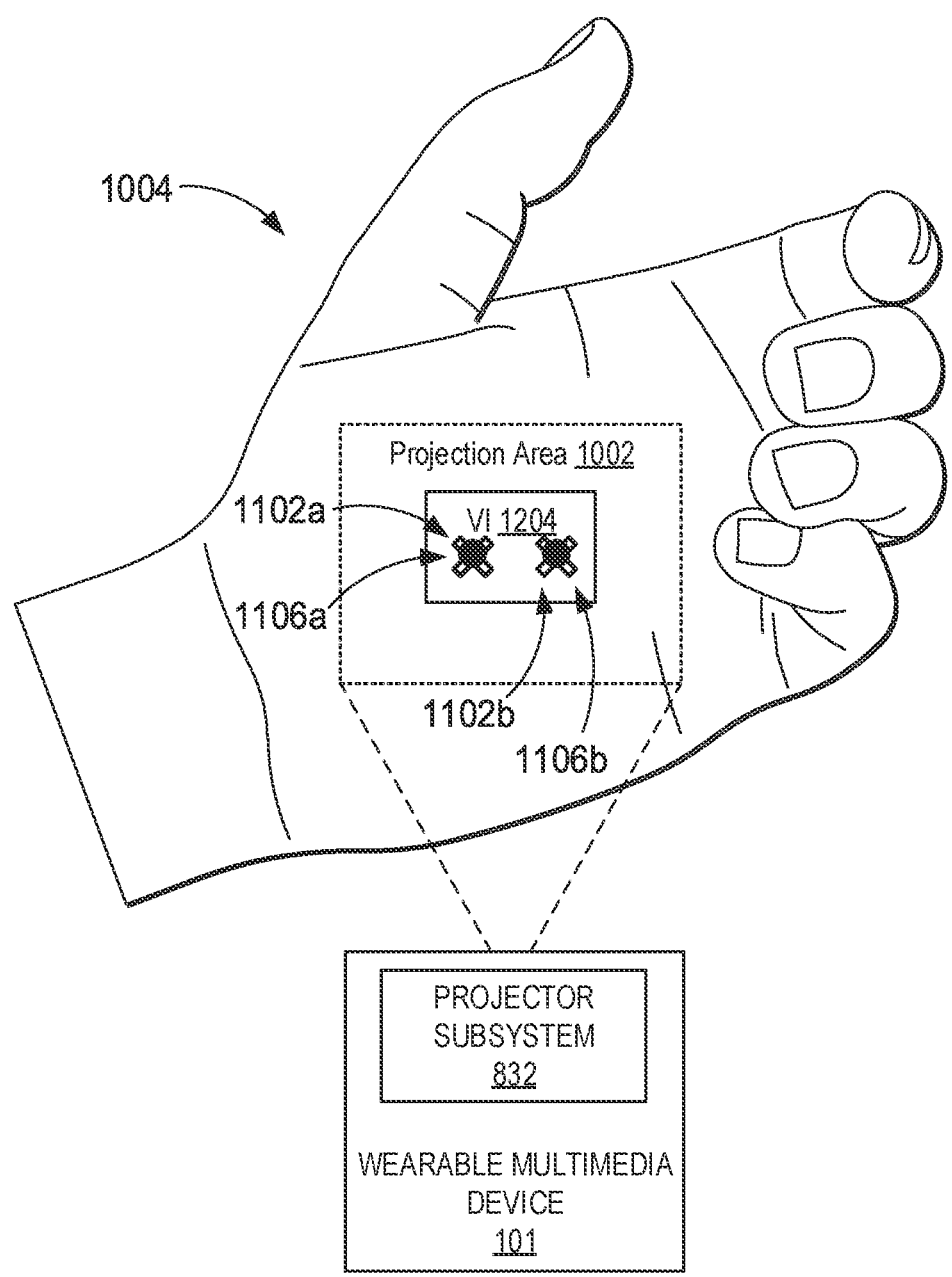

As shown in FIG. 12C, the wearable multimedia device 101 can project the VI 1204 onto the surface of the user's hand 1004, such that the registration point 1202a coincides with the registration point 1206a, and such that the registration point 1202b coincides with the registration point 1206b. Further, the wearable multimedia device 101 can scale the size of the VI 1204 on the user's hand 1004, such that the entirety of the VI 1204 fits within the projection area 1002 and/or the portion 1006 of the user's hand 1104.

Further, as described above, the wearable multimedia device 101 can adjust the projection of the VI 1204 based on the movement of the user's hand 1004. For example, if the user moves her hand 1004 to the right, the wearable multimedia device 101 can detect the movement of the registration points 1202a and 1202b on the user's hand 1004 (e.g., using the camera/video subsystems 820, environment sensor(s) 817, depth sensor(s) 814, etc.). Further, the wearable multimedia device 101 can adjust the projection of the VI 1204, such that the registration point 1102a and the registration point 1206a continue to align with one another, and such that the registration point 1102b and the registration point 1206b continue to align with one another. Accordingly, from the perspective of the user, the VI 1204 appears to remain on the same position on her hand 1004, even after she has moved her hand 1004. Further still, if the user also moved her hand closer or farther from the wearable multimedia device 101, the wearable multimedia device 101 can also adjust the projection of the VI 1204, such that the VI 1204 appears to be the same size on the user's hand 1004.

As described above, in some implementations, the wearable multimedia device 101 can detect when a portion of the user's hand is positioned near the outside of the projection area 1002 of the projector subsystem 832 (e.g., but still within the projection area 1002), and generate a notification to the user preemptively instructing her to move that portion of the user's hand back towards the center of the projection area 1002. This can be beneficial, for example, in reducing the likelihood that the user will position her hand in such a way that the wearable multimedia device 101 cannot project the entirety of a VI on the user's hand.

Figure 13:
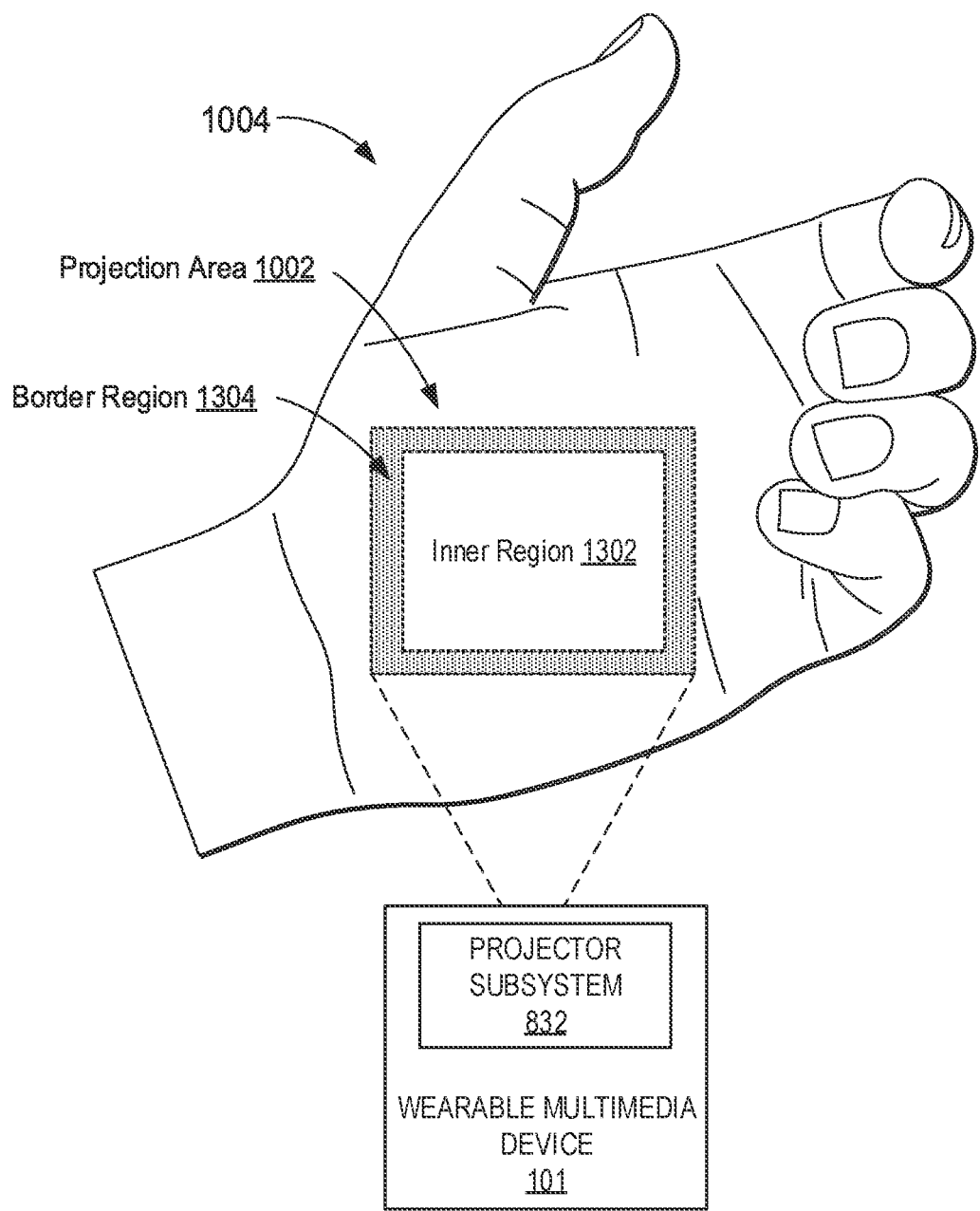
FIG. 13 is a diagram of an example projection area.

As an example, as shown in FIG. 13, the projector subsystem 832 can be configured to project light into a projection area 1002 (represented as a dashed rectangular outline). Although the projection area 1002 is depicted in FIG. 11A as a rectangular region of space, in practice, the projection area 1002 can be any shape (e.g., polygonal, curved, and/or a combination thereof).

Further, the projection area 1002 can include an inner region 1302, and a border region 1304 that at least partially encloses the inner region 1302. For example, as shown in FIG. 13, the projection area 1002 can include an inner region 1302 (represented as a white rectangle) that is entirely enclosed by a border region 1304 (represented as a shaded rectangular border or frame). In some implementations, the inner region 1302 can be centered within the border region 1304. Although the inner region 1302 and the border region 1304 are depicted in FIG. 13 as respective rectangular regions of space, in practice, the inner region 1302 and the border region 1304 can be any shape (e.g., polygonal, curved, and/or a combination thereof).

The wearable multimedia device 101 can determine an alignment between the user's hand and the VI (e.g., as described with reference to FIGS. 11A-11E and 12A-12C), and determine whether any portion (or portions) of the VI would be presented in the border region 1304 of the projection area 1002. If so, the wearable multimedia device 101 can modify a visual appearance of the VI to notify the user (e.g., such that the user can preemptively move her hand back towards the center of the projection area).

In some implementations, the wearable multimedia device 101 can modify a visual appearance of a first portion of the VI that coincides with the border region 1304, while maintaining the visual appearance of a second portion of the VI that is outside of the border region 1304 (e.g., the portion of the VI that coincides with the inner region 1302). As an example, the wearable multimedia device 101 can change the color of the first portion, change a visual pattern of the first portion (e.g., apply a patterned overlay or background to the first portion), blur the first portion, distort a visual appearance of the first portion, apply an image or video filter to the first portion, and/or change any other visual characteristic of the first portion.

Figure 14A:
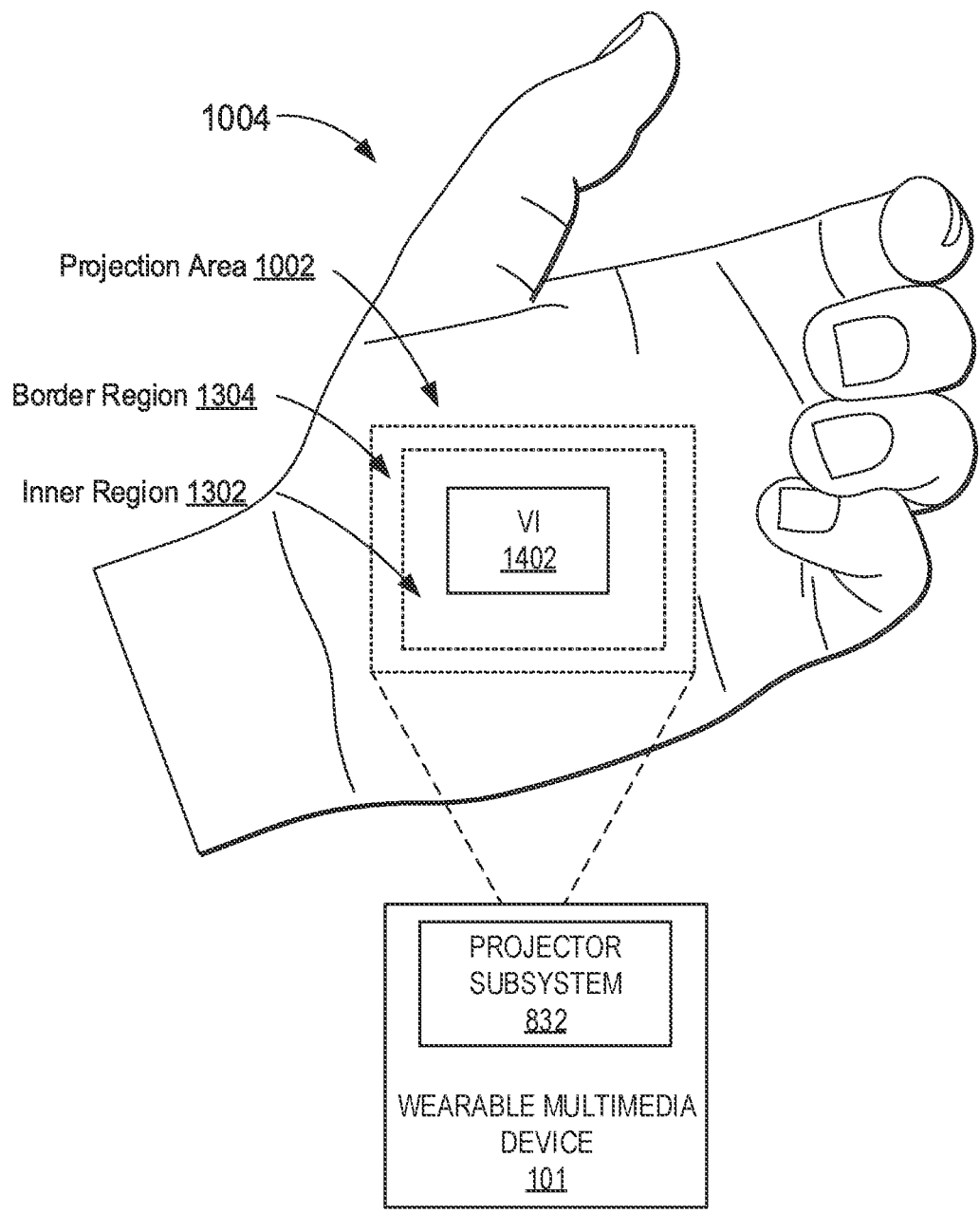
FIGS. 14A-14D are diagrams of further example operations performed by a wearable multimedia device to present a virtual interface to the user.
Figure 14B:
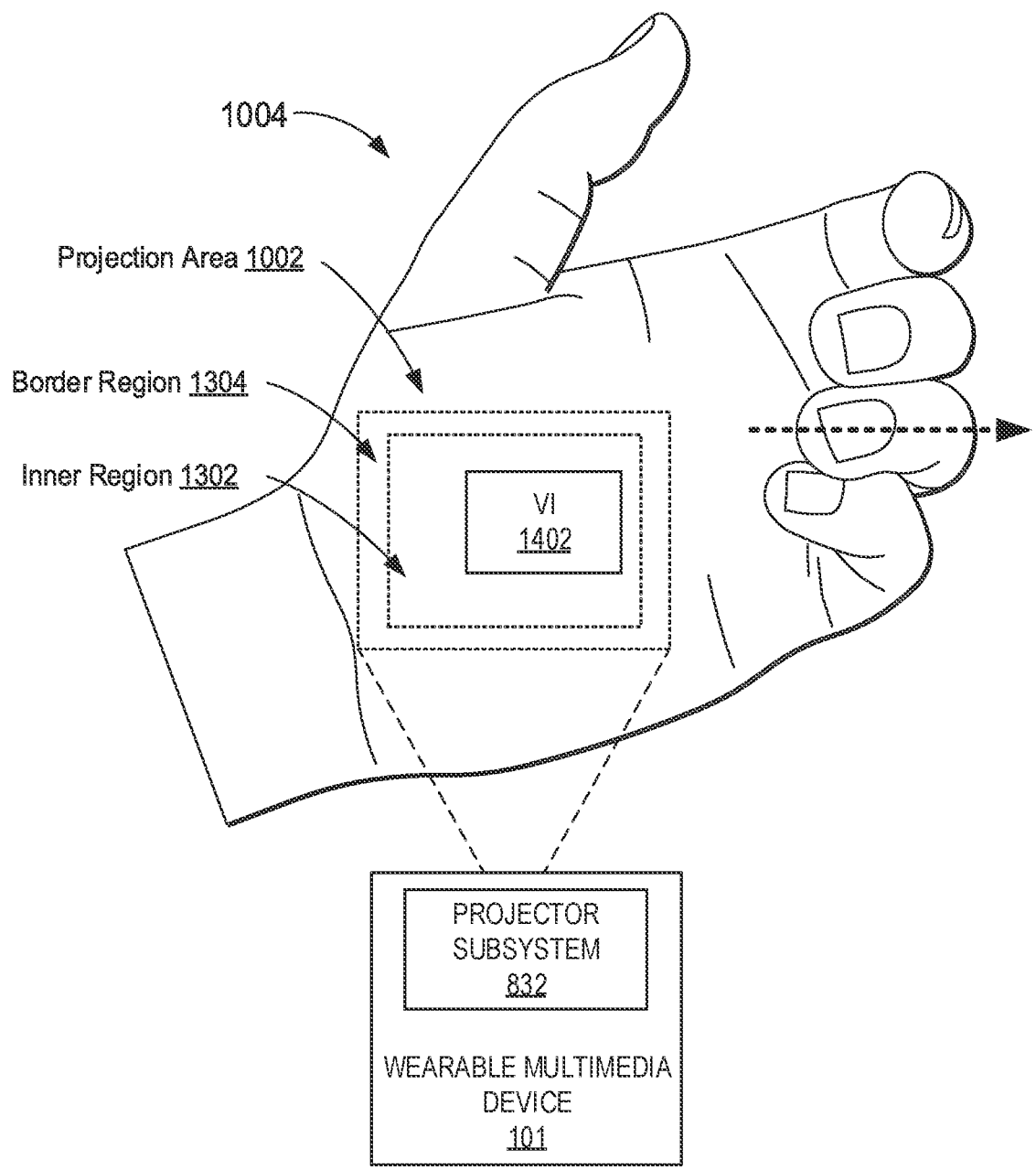

FIGS. 14A-14B show an example implementation of the techniques described above.

As shown in FIG. 14A, the wearable multimedia device 101 can determine the location of the user's hand 1004 (e.g., relative to the wearable multimedia device 101), and project a VI 1402 on the surface of the user's hand 1004 within a projection area 1002. In some implementations, the wearable multimedia device 101 can project the VI 1402, at least in part, by determining the location one or more registration points on the user's hand 1004, and projecting the VI 1402 such that one or more corresponding registration points on the VI 1402 coincide with the one or more registration points on the user's hand 1004 (e.g., as described with reference to FIGS. 11A-12C).

Further, the wearable multimedia device 101 can adjust the projection of the VI 1402 based on the movement of the user's hand 1004. For example, as shown in FIG. 14B, if the user moves her hand 1004 to the right, the wearable multimedia device 101 can detect the movement (e.g., using the camera/video subsystems 820, environment sensor(s) 817, depth sensor(s) 814, etc.). Further, the wearable multimedia device 101 can adjust the projection of the VI 1404, such that the VI 1404 remains aligned with the user's hand 1004. As described above, the wearable multimedia device 101 can adjust the projection of the VI 1402, at least in part, by determining the movement of the registration point(s) on the user's hand 1004, and projecting the VI 1404 such that each of the registration point(s) in the VI 1404 coincides with a respective registration point on the user's hand 1404.

In the example shown in FIG. 14B, the user's hand 1004 is positioned such that the wearable multimedia device 101 can project the entirety of the VI 1402 on the user's hand 1004. For example, the wearable multimedia device 101 can align the VI 1402 with the user's hand, while keeping the VI 1402 entirely within the projection area 1002 (e.g., entirely within the inner region 1302).

Figure 14C:
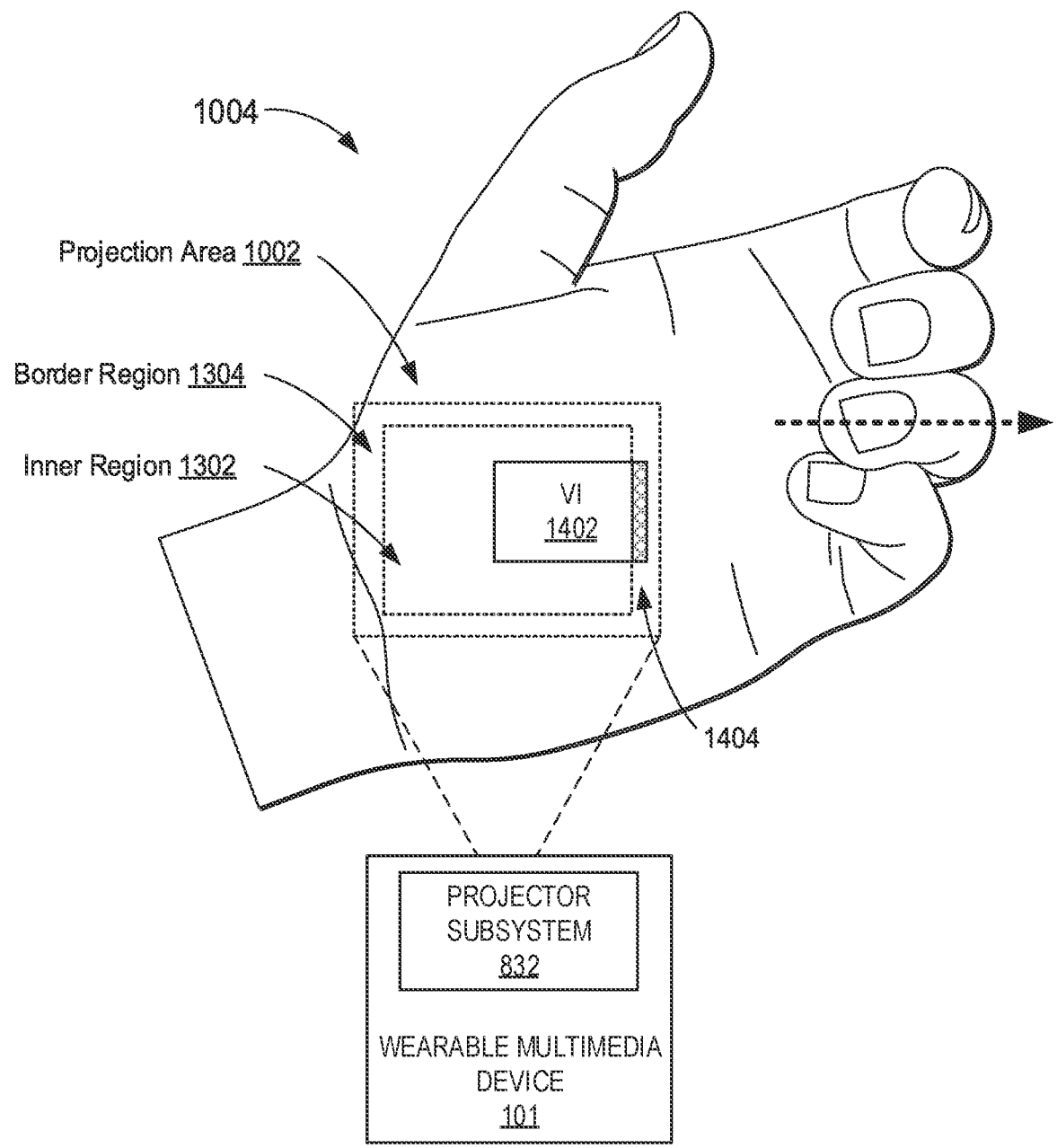

In the example, shown in FIG. 14C, the user has moved her hand further to the right. Although the wearable multimedia device 101 can align the VI 1402 with the user's hand, such that the VI 1402 continues to be entirely within the projection area 1002, a portion 1404 of the VI 1402 would coincide with the border region 1304.

As described above, the wearable multimedia device 101 can modify a visual appearance of the VI to notify the user (e.g., such that the user can preemptively move her hand 1004 back towards the center of the projection area 1002). For instance, the wearable multimedia device 101 can modify a visual appearance of the portion 1404 of the VI 1402, while maintaining the visual appearance of the remaining portion of the VI 1404 that is outside of the border region 1304 (e.g., the portion of the VI 1402 that coincides with the inner region 1302). Accordingly, the user can visually ascertain that the position of her hand is approaching the projection limits of the projector subsystem 832 (but has not yet actually exceeded the projection limits), and reposition her hand to avoid interruption of the VI 1402.

Figure 15A:
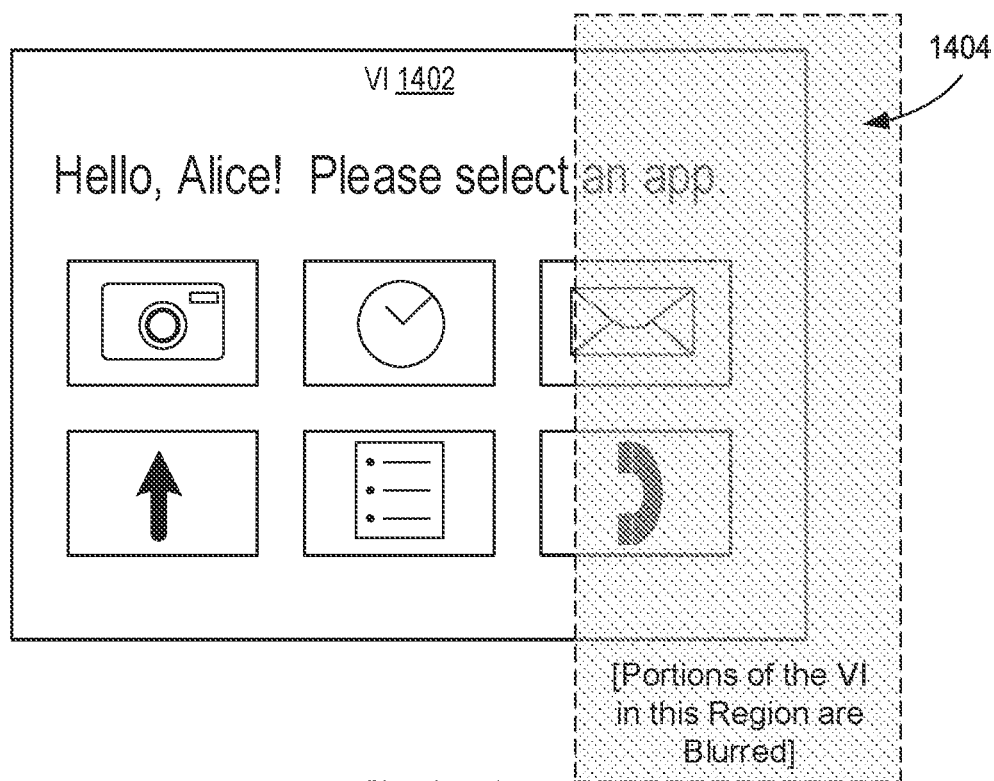
FIGS. 15A-15C are diagrams of example virtual interfaces.

As an example, referring to FIG. 15A, the wearable multimedia device 101 can blur the portion 1404 of the VI 1402, while maintaining the visual appearance of the remainder of the VI 1402 (e.g., the portion of the VI 1402 that coincides with the inner region 1302).

Figure 15B:
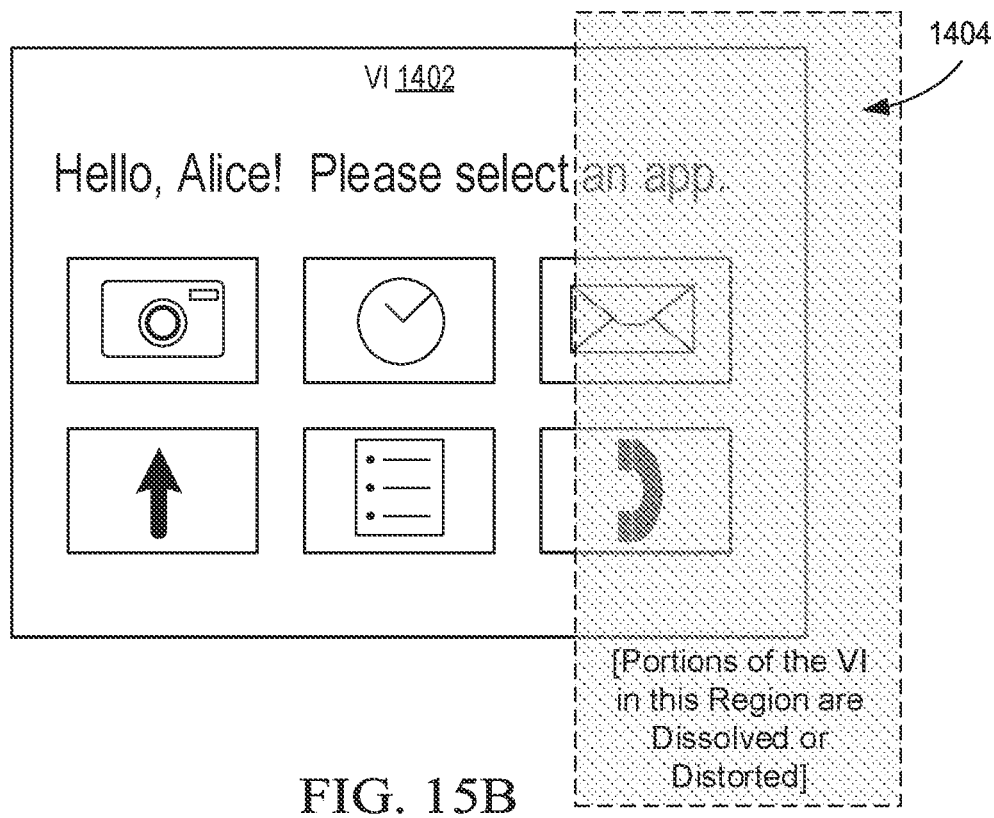

As an example, referring to FIG. 15B, the wearable multimedia device 101 can distort a visual appearance of the portion 1404 of the VI 1402, while maintaining the visual appearance of the remainder of the VI 1402 (e.g., the portion of the VI 1402 that coincides with the inner region 1302). In some implementations, the wearable multimedia device 101 can distort a visual appearance of the portion 1404 of the VI 1402, such that the portion 1404 appears to be dissolving, degrading, or breaking apart.

Figure 15C:
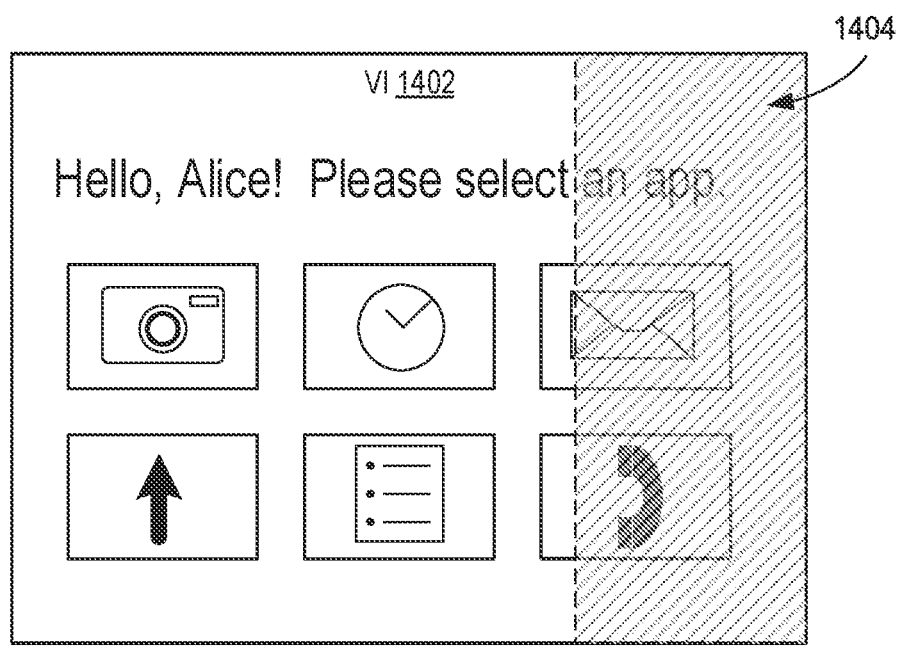

As another example, referring to FIG. 15C, the wearable multimedia device 101 can change a color and/or visual pattern of the portion 1404 of the VI 1402, while maintaining the visual appearance of the remainder of the VI 1402 (e.g., the portion of the VI 1402 that coincides with the inner region 1302). As an example, the wearable multimedia device 101 can change a background color and/or pattern of the portion 1404. As another example, the wearable multimedia device 101 can applying an overlay having a particular color and/or pattern over the portion 1404.

In some implementations, the wearable multimedia device 101 can modify a visual appearance of the VI 1402 by applying one or more image and/or video filters to the VI 1402 (or portions thereof). As an example, the wearable multimedia device 101 can apply a blur filter, a distortion filter, a color modification filter, an overlay filter, and/or any other filter to the portion 1404.

Figure 14D:
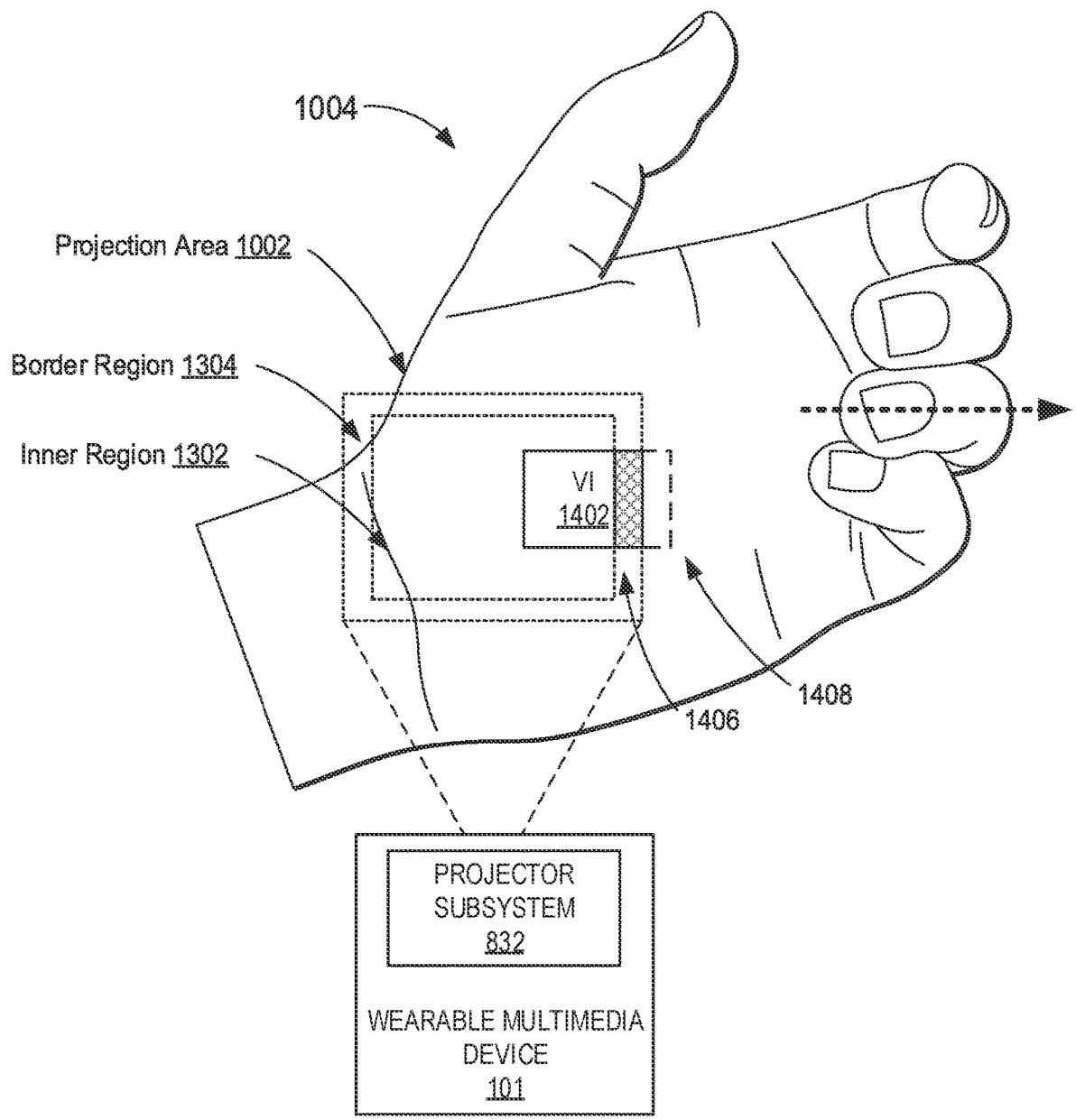

In the example shown in FIG. 14D, the user has moved her hand even further to the right. In this example, the wearable multimedia device 101 can no longer align the VI 1402 with the user's hand while maintaining the VI 1402 entirely within the projection area 1002. The wearable multimedia device 101 can modify a visual appearance of the VI to notify the user. For instance, the wearable multimedia device 101 can modify a visual appearance of the portion 1406 of the VI 1402 that coincides with the border 1304, while maintaining the visual appearance of the portion of the VI 1404 that coincides with the inner region 1302. Further, the wearable multimedia device 101 can refrain from presenting the portion 1408 of the VI 1402 that would otherwise be positioned outside of the projection area 1002 (e.g., as that portion of the VI 1402 would be beyond the projection limit of the projector subsystem 832).

Further, although FIGS. 10-15C describe example operations that can be performed using a VI (e.g., a VI that is projected by a projector subsystem 832), in practice, similar operations also can be performed using other types of user interfaces. As an example, some or all of these operations can be performed using a user interface that is presented using a display device such as a computer monitor or a touch sensitive display panel.

Additional Example Processes

Figure 16:
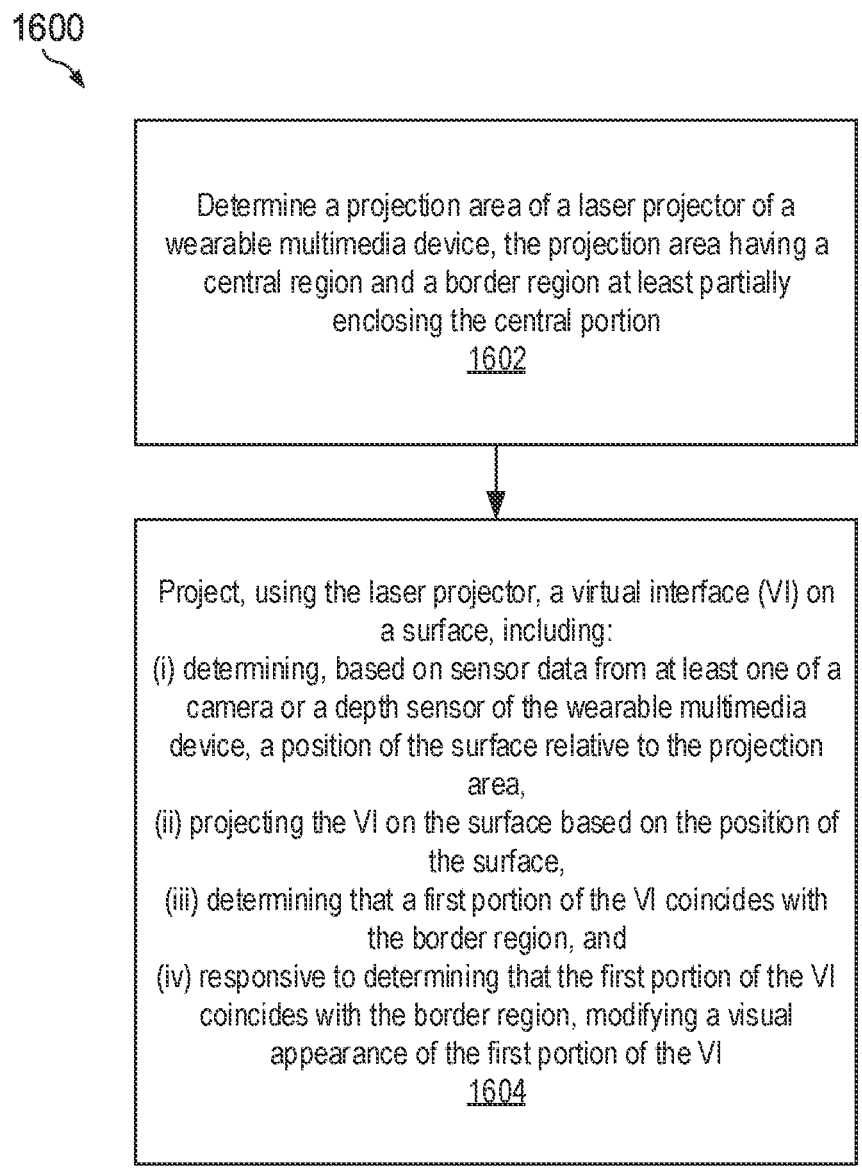
FIG. 16 is flow diagram of a process for presenting a virtual interface, according to an embodiment.

FIG. 16 is flow diagram of an example process 1600 for presenting a virtual interface to a user, according to an embodiment. Process 1600 can be implemented using wearable multimedia devices 101 described in reference to FIGS. 1-9.

According to the process 1600 a wearable multimedia device determines a projection area of a laser projector of a wearable multimedia device (block 1602). The projection area includes an inner region and a border region at least partially enclosing the inner region.

In some implementations, the projection area can correspond to a projection area of the laser projector.

In some implementations, the border region can be the portion of the projection area other than the inner region.

In some implementations, the inner region can be centered in the projection area.

In some implementations, the border region can define a polygonal border around the inner region. Further, the polygonal border can be a rectangle, a trapezoid, a parallelogram, and/or a rhombus.

In some implementations, the border region can define a curved border around the inner region.

In some implementations, the border region can entirely enclose the inner region.

Further, the wearable multimedia device projects, using the laser projector, a virtual interface (VI) on a surface (block 1604). In particular, the wearable multimedia device determines, based on sensor data from at least one of a camera or a depth sensor of the wearable multimedia device, a position of the surface relative to the projection area. Further, the wearable multimedia device projects the VI on the surface based on the position of the surface. Further, the wearable multimedia device determines that a first portion of the VI coincides with the border region, and in response, modifies a visual appearance of the first portion of the VI.

In some implementations, modifying the visual appearance of the first portion of the VI can include blurring the first portion of the VI, distorting the first portion of the VI, changing a color of the first portion of the VI, and/or visually degrading the first portion of the VI.

In some implementations, the wearable multimedia device can perform one or more additional operations in response to determining that the first portion of the VI coincides with the border region. As an example, the wearable multimedia device can present an audio alert using a speaker of the wearable multimedia device. As another example, the wearable multimedia device can present a haptic alert using a haptic device of the wearable multimedia device.

In some implementations, the wearable multimedia device can project the VI on the surface, at least in part, by determining a first registration point of the VI, determining a second registration point on the surface, and projecting the VI on the surface such that the first registration point of the VI coincides with the second registration point of the surface.

In some implementations, the wearable multimedia device can project the VI on the surface, at least in part, by determining a plurality of first registration points of the VI, determining a plurality second registration points on the surface, and projecting the VI on the surface such that each of the first registration points of the VI coincides with a corresponding one of the second registration points of the surface.

In some implementations, the surface can be a surface of a hand of a user. In some implementations, the surface can be a palm of the hand.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining a projection area of a laser projector of a wearable multimedia device, the projection area corresponding to a range within which the laser projector is configured to focus and direct light to form visual content, the projection area having an inner region on a surface of a user's hand and a border region on the surface of the user's hand, the border region enclosing the inner region on the surface of the user's hand; and
   projecting, using the laser projector, a visual interface (VI) on the surface of the user's hand, wherein projecting the VI comprises:
      determining, based on sensor data from at least one of a camera or a depth sensor of the wearable multimedia device, a position of the projection area on the surface of the user's hand,
      projecting the VI on the surface of the user's hand based on the position of the projection area on the surface of the user's hand,
      determining that a first visible portion of the VI coincides with the border region on the surface of the user's hand, and
      responsive to determining that the first visible portion of the VI coincides with the border region on the surface of the user's hand:
         modifying a visual appearance of the first visible portion of the VI on the surface of the user's hand, and
         maintaining a visual appearance of a second visible portion of the VI on the surface of the user's hand, wherein the second visible portion coincides with the inner region on the surface of the user' hand.

2. The method of claim 1, wherein modifying the visual appearance of the first visible portion of the VI comprises at least one of:
   blurring the first visible portion of the VI,
   distorting the first visible portion of the VI,
   changing a color of the first visible portion of the VI, or
   visually degrading the first visible portion of the VI.

3. The method of claim 1, further comprising:
   responsive to determining that the first visible portion of the VI coincides with the border region, performing one of:
      presenting an audio alert using a speaker of the wearable multimedia device, or
      presenting a haptic alert using a haptic device of the wearable multimedia device.

4. The method of claim 1, wherein the border region is the portion of the projection area other than the inner region.

5. The method of claim 1, wherein the inner region is centered in the projection area on the surface of the user's hand.

6. The method of claim 1, wherein the border region defines a polygonal border around the inner region on the surface of the user's hand.

7. The method of claim 6, wherein the polygonal border is at least one of a rectangle, a trapezoid, a parallelogram, or a rhombus.

8. The method of claim 1, wherein the border region defines a curved border around the inner region on the surface of the user's hand.

9. The method of claim 1, wherein projecting the VI on the surface of the user's hand comprises:
   determining a first registration point of the VI,
   determining a second registration point on the surface of the user's hand, and
   projecting the VI on the surface of the user's hand such that the first registration point of the VI coincides with the second registration point of the surface of the user's hand.

10. The method of claim 1, wherein projecting the VI on the surface of the user's hand comprises:
    determining a plurality of first registration points of the VI,
    determining a plurality second registration points on the surface of the user's hand, and
    projecting the VI on the surface of the user's hand such that each of the first registration points of the VI coincides with a corresponding one of the second registration points of the surface of the user's hand.

11. The method of claim 1, wherein the surface of the user's hand is a palm of the user's hand.

12. A wearable multimedia device, comprising:
    at least one of a camera or a depth sensor;
    a laser projector;
    one or more processors; and
    memory storing instructions that, when executed by the one or more processors, cause the one or more processors to perform operations comprising:
       determining a projection area of the laser projector, the projection area corresponding to a range within which the laser projector is configured to focus and direct light to form visual content, the projection area having an inner region on a surface of a user's hand and a border region on the surface of the user's hand, the border region enclosing the inner region on the surface of the user's hand; and projecting, using the laser projector, a visible interface (VI) on the surface of the user's hand, wherein projecting the VI comprises:

determining, based on sensor data from at least one of the camera or the depth sensor, a position of the projection area on the surface of the user's hand, projecting the VI on the surface of the user's hand based on the position of the projection area on the surface of the user's hand, determining that a first visible portion of the VI coincides with the border region on the surface of the user's hand, and responsive to determining that the first visible portion of the VI coincides with the border region on the surface of the user's hand:

modifying a visual appearance of the first visible portion of the VI on the surface of the user's hand, and maintaining a visual appearance of a second visible portion of the VI on the surface of the user's hand, wherein the second visible portion coincides with the inner region on the surface of the user' hand.

13. One or more non-transitory computer-readable media storing instructions that, when executed by at least one processor, cause the at least one processor to perform operations comprising:

determining a projection area of a laser projector of a wearable multimedia device, the projection area corresponding to a range within which the laser projector is configured to focus and direct light to form visual content, the projection area having an inner region on a surface of a user's hand and a border region on the surface of the user's hand, the border region enclosing the inner region on the surface of the user's hand; and projecting, using the laser projector, a visual interface (VI) on the surface of the user's hand, wherein projecting the VI comprises:

determining, based on sensor data from at least one of a camera or a depth sensor of the wearable multimedia device, a position of the projection area on the surface of the user's hand, projecting the VI on the surface of the user's hand based on the position of the projection area on the surface of the user's hand, determining that a first visible portion of the VI coincides with the border region, and responsive to determining that the first portion of the VI coincides with the border region on the surface of the user's hand:

modifying a visual appearance of the first visible portion of the VI on the surface of the user's hand, and maintaining a visual appearance of a second visible portion of the VI on the surface of the user's hand, wherein the second visible portion coincides with the inner region on the surface of the user' hand.

* * * * *